US008244386B2

(12) United States Patent
Gray

(10) Patent No.: US 8,244,386 B2
(45) Date of Patent: Aug. 14, 2012

(54) MACHINE TOOL SYSTEM CONTROL HAVING AUTOMATIC SAFE REPOSITIONING

(75) Inventor: Paul J. Gray, Zionsville, IN (US)

(73) Assignee: Hurco Companies, Inc., Indianapolis, IN (US)

( * ) Notice: Subject to any disclaimer, the term of this patent is extended or adjusted under 35 U.S.C. 154(b) by 242 days.

(21) Appl. No.: 12/575,847

(22) Filed: Oct. 8, 2009

(65) Prior Publication Data
US 2011/0087364 A1    Apr. 14, 2011

(51) Int. Cl.
G06F 19/00    (2011.01)
(52) U.S. Cl. ............................ 700/61; 700/181; 700/186
(58) Field of Classification Search ................ 700/61, 700/181, 186
See application file for complete search history.

(56) References Cited

U.S. PATENT DOCUMENTS

| | | | | |
|---|---|---|---|---|
| 3,857,025 A | * | 12/1974 | English et al. | 700/160 |
| 3,976,928 A | * | 8/1976 | Wenzel | 318/578 |
| 4,055,787 A | | 10/1977 | Beadle et al. | |
| 4,157,679 A | * | 6/1979 | Wenzel | 409/99 |
| 4,636,938 A | * | 1/1987 | Broome | 700/86 |
| 4,748,554 A | * | 5/1988 | Gebauer et al. | 700/174 |
| 4,794,311 A | * | 12/1988 | Kiya et al. | 318/569 |
| 4,815,000 A | * | 3/1989 | Yoneda et al. | 700/192 |
| 5,808,888 A | * | 9/1998 | Susnjara et al. | 700/86 |
| 6,022,132 A | * | 2/2000 | Schulz | 700/186 |
| 6,772,020 B2 | * | 8/2004 | Kohler et al. | 700/73 |
| 2004/0158335 A1 | * | 8/2004 | Fujibayashi et al. | 700/61 |
| 2007/0167966 A1 | * | 7/2007 | Simpson et al. | 606/180 |
| 2008/0058982 A1 | | 3/2008 | Gray | |
| 2008/0091295 A1 | | 4/2008 | Corey | |
| 2008/0281462 A1 | * | 11/2008 | Suh et al. | 700/181 |
| 2010/0269327 A1 | * | 10/2010 | Gray | 29/592 |

FOREIGN PATENT DOCUMENTS

JP    2007249484 A    *    9/2007

OTHER PUBLICATIONS

International Search Report and Written Opinion for PCT/US2010/051408 (18 pages).

* cited by examiner

Primary Examiner — Michael D Masinick
(74) Attorney, Agent, or Firm — Faegre Baker Daniels LLP

(57) ABSTRACT

The present disclosure includes a motion control system for a machine tool system configured to shape a part with a tool, including an I/O module with machine configuration information that defines limits of a three-dimensional working space of the machine tool system. The I/O module further includes a part program that specifies first and second positions of the tool without reference to the working space limits. The motion control system further includes a software controller configured to internally process moves to determine whether the tool can be repositioned from the first position to the second position while maintaining the tool above a minimum clearance from the part and within the working space limits, output the internally processed moves to the machine tool system to cause movement of the tool if the tool can be safely repositioned, and output an error if the tool cannot be safely repositioned.

54 Claims, 17 Drawing Sheets

US 8,244,386 B2

MACHINE TOOL SYSTEM CONTROL HAVING AUTOMATIC SAFE REPOSITIONING

FIELD OF THE INVENTION

The invention relates to machine tool control software. More specifically, the field of the invention is that of machine tool control software that facilitates automatic tool repositioning.

BACKGROUND AND SUMMARY OF THE INVENTION

Machine tool systems generally execute part programs that include instructions interpreted by the machine tool control software to generate commands for controlling the operation of the machine tool system. Some of the instructions result in repositioning a tool, used by the machine tool system to shape or cut a part, from one position to another. It is, of course, desirable to move the tool from one position to another without making undesired contact with the part or components of the machine tool system. Accordingly, part programmers specify in the part program intermediate moves for withdrawing or retracting the tool from the first position (to put distance between the tool and the part), repositioning the tool to a location above the second position, and plunging the tool to the second position.

As should be apparent from the foregoing, programmers of part programs for use by conventional machine tool control software must specify the intermediate, repositioning moves in the part program while keeping in mind the limitations of the machine tool system that will execute the part program. All machine tool systems have a "working space," which is the three-dimensional volume within which a tool may be moved. The repositioning moves in the part program must take into account the maximum extent to which a tool may be moved in the working space, the location of the part in the working space, and the dimensions (e.g., length) of the tool being repositioned so as to avoid the generation of a motion command by the machine tool control software that exceeds a limit of the working space ("a machine limit") or causes the tool to make undesired contact with the part or a component of the machine tool system. If the part program is not written with these limitations in mind, or if the part program is executed by a machine tool system with physical characteristics that are different from those originally contemplated by the programmer, damage to the part or machine tool system may occur or execution of the part program may be terminated because a machine limit would otherwise be exceeded. The machine tool system operator must then revise the part program instructions to avoid such errors. In summary, because conventional machine tool control software must be provided repositioning moves by the part program, the part program instructions must be written for a specific machine configuration or a "worst case" machine configuration to avoid unintended consequences and/or errors.

In an exemplary embodiment of the present disclosure, a motion control system is provided for a machine tool system that automatically determines moves needed to reposition a tool from a first position specified in a part program to a second position specified in the part program while maintaining a safe distance from the part and while minimizing machine limit errors. One result of the motion control system's design is that part programs may be written in a machine-independent fashion, and executed by any of a variety of machine tool systems that employ the motion control system of the present disclosure.

In an example of the present disclosure, a method is provided for automatically repositioning a tool within a three-dimensional working space of a machine tool system from a current position to a target position. The method includes the steps of (A) computing at least one retract move of the tool, based on a retract vector, from the current position to a retracted position in a retract plane by adjusting the retract vector, as necessary, such that the retract vector corresponds to movement of the tool toward the retract plane while remaining within the working space of the machine tool system; (B) computing at least one plunge move of the tool, based on a motion vector that is an inverse of a plunge vector, from the target position to a plunge position in the retract plane by adjusting the motion vector, as necessary, such that the motion vector corresponds to movement of the tool toward the retract plane while remaining within the working space of the machine tool system; and (C) moving the tool from the current position, to the retracted position and from the plunge position to the target position.

In another exemplary embodiment of the present disclosure, a method is provided for automatically repositioning a tool of a machine tool system from a start position to a target position. The method includes the steps of (A) executing a reorientation sequence wherein the tool is moved from the start position to a reoriented position wherein the tool has an orientation corresponding to the target position; (B) executing a retract sequence including the steps of determining whether retracting the tool from the reoriented position to a retracted position in a retract plane along a retract vector would exceed an axis limit of the machine tool system, if retracting the tool along the retract vector would exceed the axis limit, clipping a direction component of the retract vector corresponding to the exceeded axis limit, and computing a new retract vector for moving the tool to the retracted position, storing a retract move of the tool from the reoriented position to the retracted position; (C) executing a plunge sequence including the steps of determining whether retracting the tool from the target position to a plunge position in the retract plane along a motion vector that is an inverse of a plunge vector would exceed an axis limit of the machine tool system, if retracting the tool along the motion vector would exceed the axis limit, clipping a direction component of the motion vector corresponding to the exceeded axis limit, and computing a new motion vector for moving the tool to the plunge position, storing a plunge move of the tool from the plunge position to the target position; (D) executing the retract move; and (E) executing the plunge move.

In yet a further exemplary embodiment of the present disclosure, a method is provided for automatically repositioning a tool of a machine tool system from a current position to a target position. The method includes the steps of (A) computing a retract sequence including the steps of determining whether retracting the tool from the current position to a retracted position in a retract plane along a retract vector would exceed any axis limits of the machine tool system, adjusting the retract vector to avoid exceeding any axis limits, storing at least one move in a retract sequence of moves for repositioning the tool from the current position to the retracted position; (B) computing a plunge sequence including the steps of determining whether retracting the tool from the target position to a plunge position in the retract plane along a motion vector that is an inverse of a plunge vector would exceed any axis limits of the machine tool system, adjusting the motion vector to avoid exceeding any axis limits, storing in reverse order at least one move in a plunge sequence of moves for repositioning the tool from the target position to the plunge position; (D) executing the retract sequence of moves; and (E) executing the plunge sequence of moves.

In a still further exemplary embodiment of the present disclosure, an apparatus is provided for machining a part with at least one tool. The apparatus comprises a frame; a moveable support supported by and moveable relative to the frame, the moveable support supporting the part; a machine tool spindle supported by the frame and moveable relative to the part, the machine tool spindle adapted to couple to the at least one tool, the moveable support and the machine tool spindle being movable by a drive system within a three-dimensional working space defined by a plurality of axis limits; and a motion control system operably coupled to the machine tool spindle and the moveable support, the motion control system including a controller that controls movement of the machine tool spindle and the moveable support to automatically reposition the tool from a first position to a second position, both positions being specified by a part program independently of the plurality of axis limits. The controller of the apparatus repositions the tool by computing at least one retract move of the tool, based on a retract vector, from the first position to a retracted position in a retract plane by adjusting the retract vector, as necessary, such that the retract vector corresponds to movement of the tool toward the retract plane while remaining within the three-dimensional working space; computing at least one plunge move of the tool, based on a motion vector that is an inverse of a plunge vector, from the second position to a plunge position in the retract plane by adjusting the motion vector, as necessary, such that the motion vector corresponds to movement of the tool toward the retract plane while remaining within the three-dimensional working space; and outputting motion commands to the drive system, thereby moving the tool from the first position, to the retracted position and from the plunge position to the second position.

In a still further exemplary embodiment of the present disclosure, a motion control system is provided for a multi-axis machine tool system having a support, a spindle, and a drive system coupled to the support and the spindle for adjusting the position of a tool relative to a part. The motion control system includes an I/O module including a part program including a plurality of commands and machine configuration information that defines a three-dimensional working space of the machine tool system; and a software controller that receives the machine configuration information from the I/O module, processes the part program commands, and outputs motion commands to the drive system that result in relative motion of the tool and the part. The software controller includes an algorithm for repositioning the tool from a first position to a second position while automatically remaining within the three-dimensional working space, both positions being specified by the part program without reference to the machine configuration information, the algorithm including the steps of repositioning the tool by outputting motion commands to the drive system to move the tool from the first position to a reoriented position at a limit of the three-dimensional working space in an orientation relative to the part that corresponds to an orientation of the second position, computing a retract move of the tool, based on a current retract vector, from the reoriented position to a retracted position in a retract plane by adjusting the current retract vector, as necessary, to maintain the tool within the three-dimensional working space, computing at least one plunge move of the tool, based on a current motion vector that is an inverse of a plunge vector, from the second position to a plunge position in the retract plane by adjusting the current motion vector, as necessary, to maintain the tool within the three-dimensional working space, and outputting motion commands to the drive system, thereby moving the tool from the first position, to the retracted position and from the plunge position to the second position.

In yet a further exemplary embodiment of the present disclosure, a motion control system is provided for a multi-axis machine tool system configured to shape a part with a movable tool. The motion control system includes an I/O module including machine configuration information that defines three axis limits of a three-dimensional working space of the machine tool system and a part program that specifies a first position of a tool and a second position of the tool without reference to the location of the part within the working space, the dimensions of the tool, or the limits; and a software controller configured to (A) internally process moves to determine whether the tool can be safely repositioned from the first position to the second position, safe repositioning being defines as maintaining the tool above a minimum clearance from the part and within the limits, (B) output the internally processed moves to the machine tool system to cause movement of the tool from the first position to the second position if the tool can be safely repositioned, and (C) output an error to the machine tool system if the tool cannot be safely repositioned.

BRIEF DESCRIPTION OF THE DRAWINGS

The above mentioned and other features and objects of this disclosure, and the manner of attaining them, will become more apparent and the disclosure itself will be better understood by reference to the following description of embodiments taken in conjunction with the accompanying drawings, wherein.

Corresponding reference characters indicate corresponding parts throughout the several views.

DETAILED DESCRIPTION OF THE DRAWINGS

The embodiments disclosed herein are not intended to be exhaustive or limit the disclosure to the precise forms disclosed in the following detailed description. Rather, the embodiments are chosen and described so that others skilled in the art may utilize their teachings.

Figure 1:
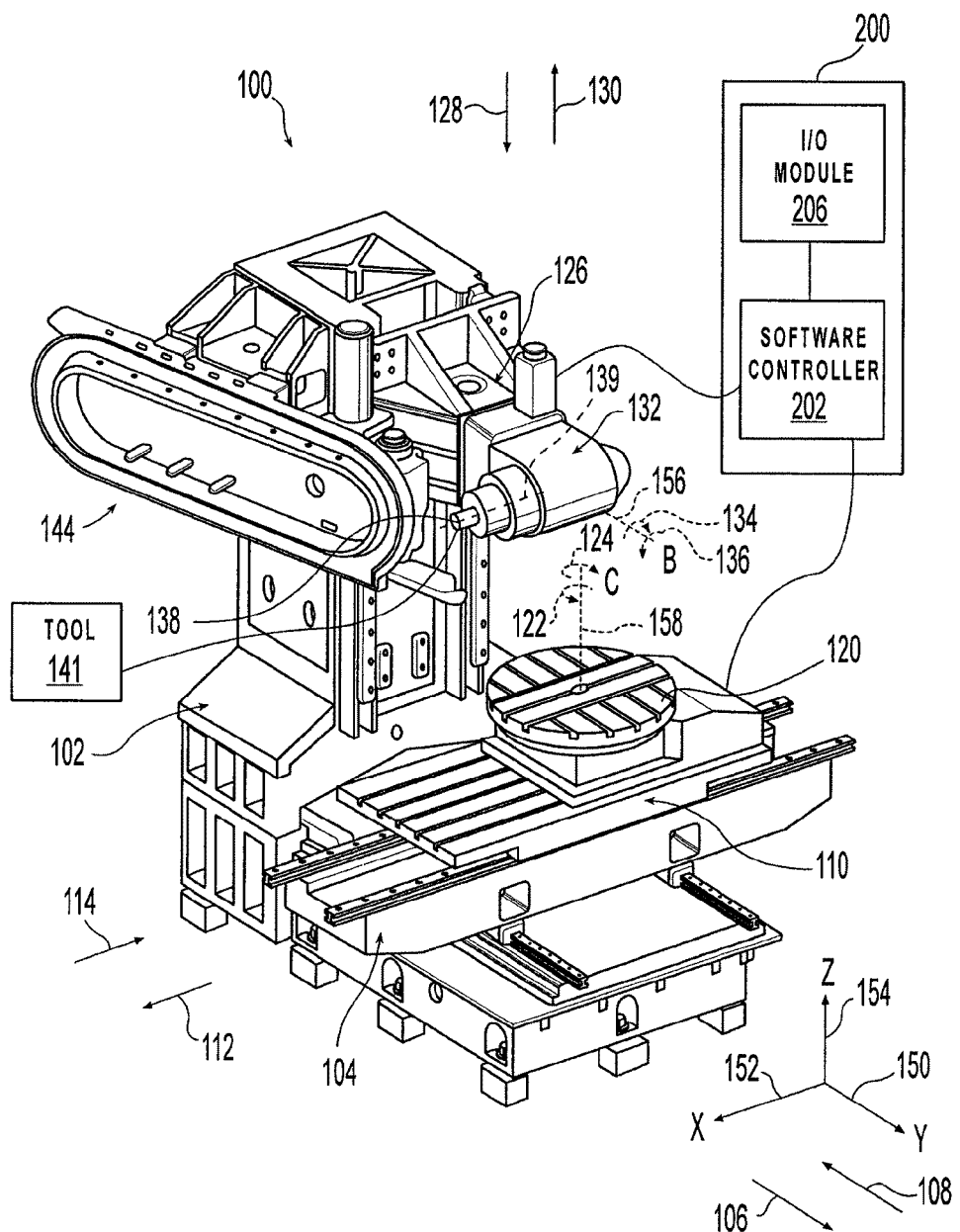
FIG. 1 illustrates an exemplary machine tool system.

Referring to FIG. 1, a machine tool system 100 is shown having a motion control system 200. Machine tool system 100 includes a frame 102 having a first saddle 104 coupled thereto. Saddle 104 is translatable in directions 106 and 108. A second saddle 110 is supported by first saddle 104. Saddle 110 is translatable in directions 112 and 114 relative to saddle 104. A platform 120 is supported by saddle 110 and is rotatable relative to saddle 110 in directions 122 and 124. In one embodiment, each of saddle 104, saddle 110, and platform 120 are moveable by a drive system including a plurality of motors which are controlled by motion control system 200.

Further, a third saddle 126 is supported by frame 102. Saddle 126 is translatable in directions 128 and 130. Saddle 126 supports a rotatable member 132. Rotatable member 132 is rotatable in directions 134 and 136 relative to saddle 126. In one embodiment, each of saddle 126 and rotatable member 132 are moveable through motors which are controlled by motion control system 200.

A tool spindle 138 is supported by rotatable member 132. Various tools 141 may be coupled to tool spindle 138 to perform various operations with machine tool system 100. Exemplary tools include an end mill, a drill, a tap, a reamer, and other suitable tools. Tool spindle 138 is rotatable about a tool spindle axis 139 to input a rotation to the tool 141. In one embodiment, a plurality of tools 141 are stored in a tool carousal 144. Additional details about tool carousal 144 are provided in U.S. Provisional application Ser. No. 11/890,384, entitled "System and Method for Tool Use Management," the disclosure of which is expressly incorporated by reference herein.

The movement of saddle 104 in direction 106 or direction 108 is illustrated as a movement in a y-axis 150. The movement of saddle 110 in direction 112 or direction 114 is illustrated as a movement in an x-axis 152. The movement of saddle 126 in direction 128 and direction 130 is illustrated as a movement in a z-axis 154. The rotation of rotatable member 132 in direction 134 or direction 136 is illustrated as a movement in a B-axis 156. The rotation of platform 120 in direction 122 or direction 124 is illustrated as a movement in a C-axis 158. Machine tool system 100 is an exemplary 5-axis machine. In one embodiment, one of B-axis 156 and C-axis 158 is replaced with an A-axis wherein platform 120 is tiltable about one of x-axis 152 and y-axis 150.

Through the movement of one or more of the 5-axes of machine tool system 100 a tool 141 may be positioned relative to a part 160 (see FIG. 3) supported by platform 120 to be machined. Part 160 may be secured to platform 120 to maintain the position of part 160 on platform 120.

Figure 2:
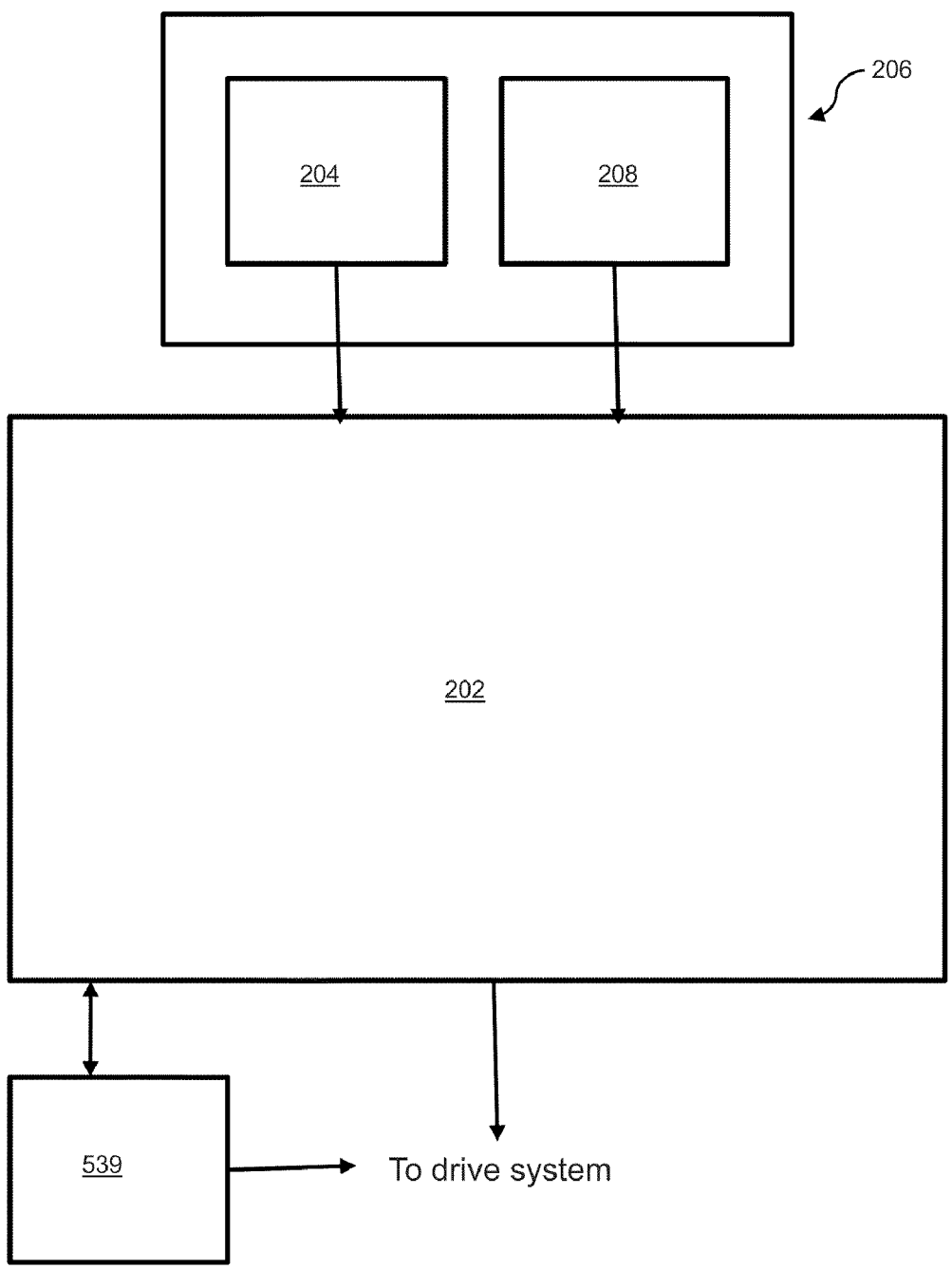
FIG. 2 block diagram of a motion control system of the exemplary machine tool system of FIG. 1.

The movement of one or more of the 5-axes of machine tool system 100 is controlled through motion control system 200. Referring to FIG. 2, motion control system 200 includes a software controller 202 and one or more I/O modules 206. It should be understood that the methods disclosed herein may be executed by software controller 202 and be stored in a manner associated with software controller 202.

Software controller 202 receives a machine configuration 208 and input data, such as a part program 204, and then provides output data, such as position data for the various axes 150, 152, 154, 156, and 158 of machine tool system 100. In the illustrated example in FIG. 2, software controller 202 receives part program 204 and machine configuration 208 from one or more I/O modules 206. Machine configuration 208 provides the dependencies between the various axes 150, 152, 154, 156, and 158 of machine tool system 100 as well as the attributes of each axis. For instance, as saddle 104 moves in direction 106 the location of C-axis 158 is changed. Therefore, the location of C-axis 158 depends on the location of saddle 104.

Exemplary I/O modules 206 includes input members, such as a user interface, a touch display, a keyboard, a mouse, one or more buttons or switches, a CD drive, a floppy drive, an interface to a determiner network (wireless or wired), and other suitable devices for providing information to software controller 202 and output members, such as a display (such as a touch screen), lights, printer, and other suitable devices for presenting information.

In one embodiment, part program 204 is entered through a conversational mode of operation whereby a user during a programming session is presented with one or more screens through a user interface (such as a touch screen and keyboard). An exemplary method of conversational programming is disclosed in U.S. Pat. No. 5,453,933, assigned to the assignee of the current application, the disclosure of which is expressly incorporated by reference herein. During the programming session, the user may program the desired geometry for the machined part and specify one or more attributes. In one example, the user specifies the desired geometry for the machined part by creating blocks of code, each of which specifies a tool and other machining parameters. The software controller 202 then generates the tool trajectories for cutting the tool to the desired geometry.

In another embodiment, part program 204 is provided through a NC mode of operation whereby an NC program is loaded into software controller 202. Part programs are frequently expressed in a standard G&M code language, or a close derivative of this language based on either the International Standards Organization (ISO) or the Electronics Industries Association (EIA) RS-274-D, using codes identified by letters such as G, M, F. The codes define a sequence of machining operations to control motion in the manufacture of a part. Software controller 202 converts the codes to provide location positions for the various axes 150, 152, 154, 156, and 158 of machine tool system 100.

Regardless of the origin of part program 204, part program 204 defines the desired geometry for the machined part either directly or based on the operations used to create the part. However, part program 204 may not specify the positions of saddles 104, 110, and 126 nor the rotations of platform 120 and rotatable member 132. These positions are determined by software controller 202.

In one embodiment, software controller 202 is an object-oriented software component. In one embodiment, software controller 202 is based on the software described in U.S. Pat. No. 5,453,933 issued on Sep. 26, 1995 and titled CNC CONTROL SYSTEM, the disclosure of which is expressly incorporated by reference herein.

FIGS. 3 through 14 are simplified, two-dimensional diagrams illustrating the various stages of motion associated with automatic safe repositioning according to one embodiment of the present disclosure. It should be understood that these two-dimensional figures are used only to simplify the description. The algorithms of the present disclosure are, of course, designed for providing automatic safe repositioning of a multi-axis machine tool in three dimensions. The description below will explain the various phases of the concept of automatic safe repositioning, including a tool reorientation sequence, a retract sequence, and a plunge sequence, with reference to the positions of tool 141 as depicted in FIGS. 3-14. The various algorithms employed by controller 202 during the reorientation, retract and plunge sequences are described later in the specification.

Figure 3:
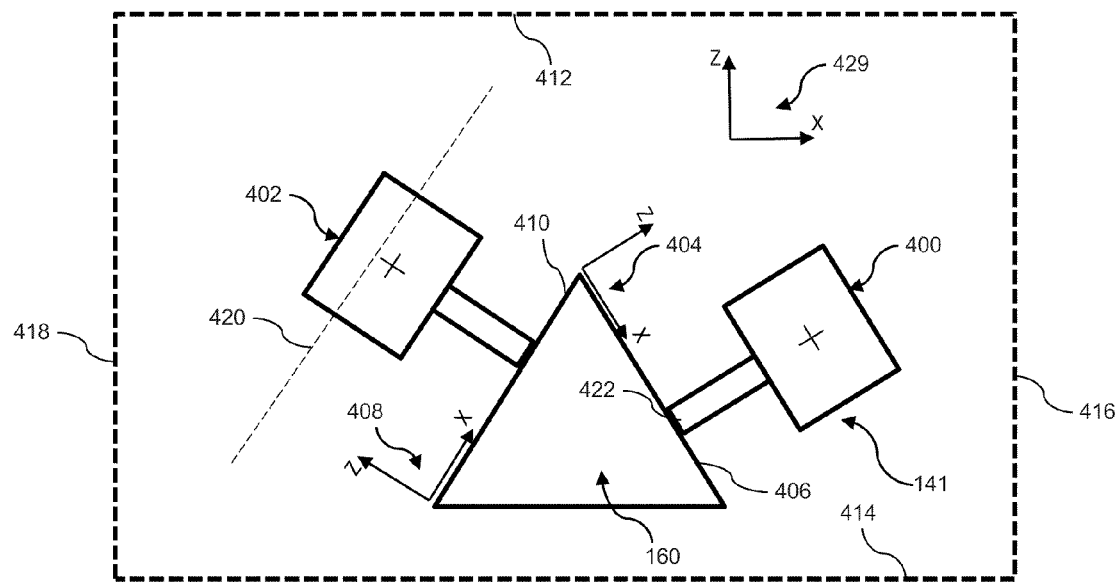
FIG. 3 is a conceptual view of a tool in a start position and a target position relative to a part.

Referring now to FIG. 3, both a start position 400 of tool 141 mounted to spindle 138 (collectively referred to as tool 141 hereinafter) and a target position 402 are shown. In the example shown, start position 400 of tool 141 may be viewed as being oriented in a first coordinate system 404 having an x-axis that is parallel to face 406 of part 160, a y-axis (not shown, but extending perpendicular to the plane of FIG. 3) that is in plane with face 406, and a z-axis that is perpendicular to face 406. As will be further described below, when tool 141 is in target position 402, tool 141 may be viewed as being oriented in a second coordinate system 408 having an x-axis that is parallel to a second face 410 of part 160, a y-axis (not shown, but extending perpendicular to the plane of FIG. 3) that is in plane with face 410, and a z-axis that is perpendicular to face 410. FIG. 3 further depicts the limits to which tool 141 may be moved within the three-dimensional working space of the particular machine tool system 100 (i.e., the "machine limits") under control of controller 202. These machine limits are provided to controller 202 as part of machine configuration 208 (FIG. 2). More specifically, line 412 represents the uppermost position for tool 141 possible within machine tool system 100 (i.e., the "positive Z limit"), line 414 represents the lowermost position for tool 141 possible within machine tool system 100 (i.e., the "negative Z limit"), and lines 416, 418 represent the rightmost and leftmost positions for tool 141 (the "positive X limit" and "negative X limit"), respectively. As mentioned above, similar limits exist for movement along the Y axis of machine tool system 100, but the Y limits are not shown in the figures to simplify the description. All of these machine limits define the three-dimensional working space of machine tool system 100.

Finally, FIG. 3 also depicts a retract plane 420, which in this example is parallel to the xy plane in second coordinate system 408. As will be further described below, retract plane 420 defines the desired safe distance of tool 141 from part 160 prior to machine tool system 100 executing a plunge motion toward part 106. As is also described below, a clearance or check plane may also be defined to establish a secondary desired safe distance of tool 141 from part 160 and used if retract plane 420 cannot be achieved given the machine limits of machine tool system 100.

FIGS. 3-10 show a sequence of movements of tool 141 under control of controller 202 during automatic safe repositioning of tool 141 from start position 400 to target position 402. In this example, tool 141 is repositioned and moved during the retract sequence and the plunge sequence along a tool vector 428 (FIGS. 4 and 7) which extends longitudinally from tool tip 422 toward spindle 138 (not shown) along the center of rotation of tool 141. As will be described below, the operation of the algorithms controlling movement of tool 141 is the same regardless of the orientation of tool 141 relative to the first of second coordinate systems 404, 408.

Figure 4:
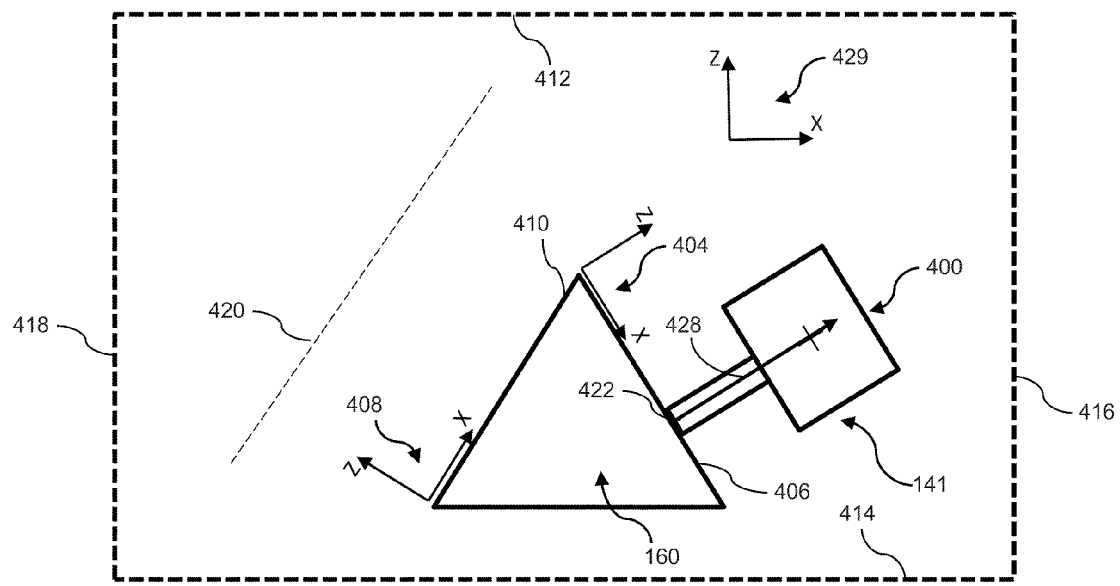
FIG. 4 is a conceptual view of the tool of FIG. 3 in the start position.

In FIG. 4, tool 141 is in start position 400. Controller 202 knows, based on machine configuration 208 and part program 204, the location of tool tip 422 and the orientation of tool 141 relative to first coordinate system 404. Controller 202 also knows the relationship between first coordinate system 404 and second coordinate system 408, as well as the location of retract plane 420. Finally, controller 202 knows the location and orientation of tool 141 when in target position 402. What is unknown are the various machine axes moves needed to relocate and reorient tool 141 from start position 400 to target position 402 (i.e., "repositioning moves") without damaging any part of machine tool system 100 or part 160 through unwanted mechanical contact and without generating errors as a result of exceeding the machine limits.

Figure 5:
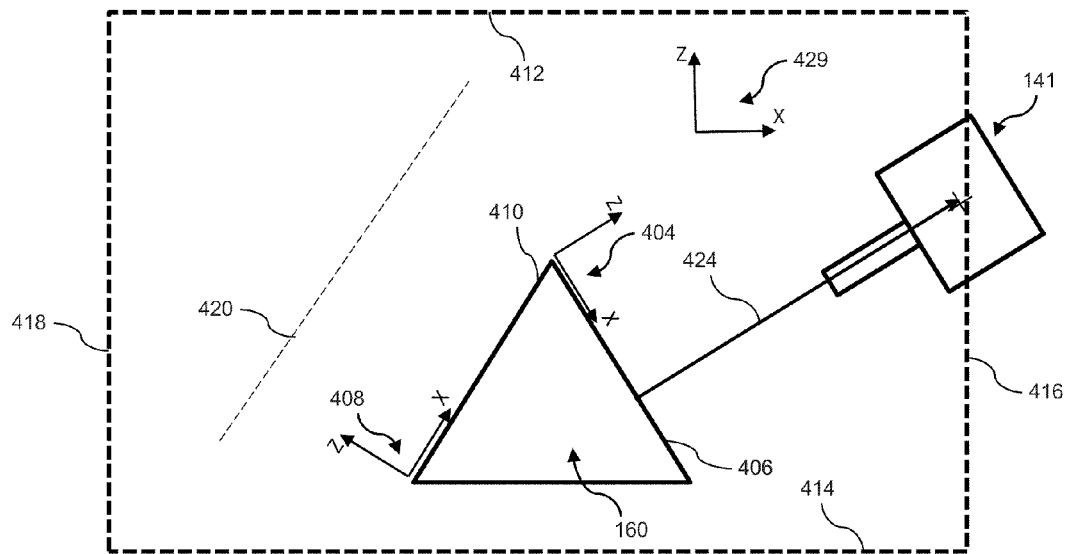
FIGS. 5-7 are conceptual views of the tool of FIG. 3 in various positions during a reorientation sequence.

Because the orientation of tool 141 in start position 400 is different from the orientation of tool 141 in target position 402 in this example, controller 202 must generate move commands to reorient tool 141 (i.e., execute a reorientation sequence). In this example, reorientation of tool 141 is accomplished by rotating tool 141 by, for example, actuating rotatable member 132 and saddle 126. It should be understood, however, that tool 141 may also be reoriented relative to part 160 by moving part 160 such as by actuating platform 120, saddle 110, and/or saddle 104, or by moving both tool 141 and part 160. Controller 202 computes an initial sequence of moves of tool 141 to accomplish reorientation of tool 141 with maximum clearance between tool 141 and part 160. In this example, controller 202 causes retraction of tool 141 along tool vector 423 until tool 141 reaches a machine limit. In this example, as shown in FIG. 5, tool 141 moves through vector 424 and reaches positive X limit 416 of machine tool system 100. Controller 202 next causes tool 141 to move in a direction along positive X limit 416 that generates additional clearance between tool 141 and part 160. In this example, controller 202 causes tool 141 to move through vector 426 (FIG. 6) along positive X limit 416 in the positive direction of the z-axis of machine tool coordinate system 429 until tool 141 reaches positive Z limit 412.

Figure 6:
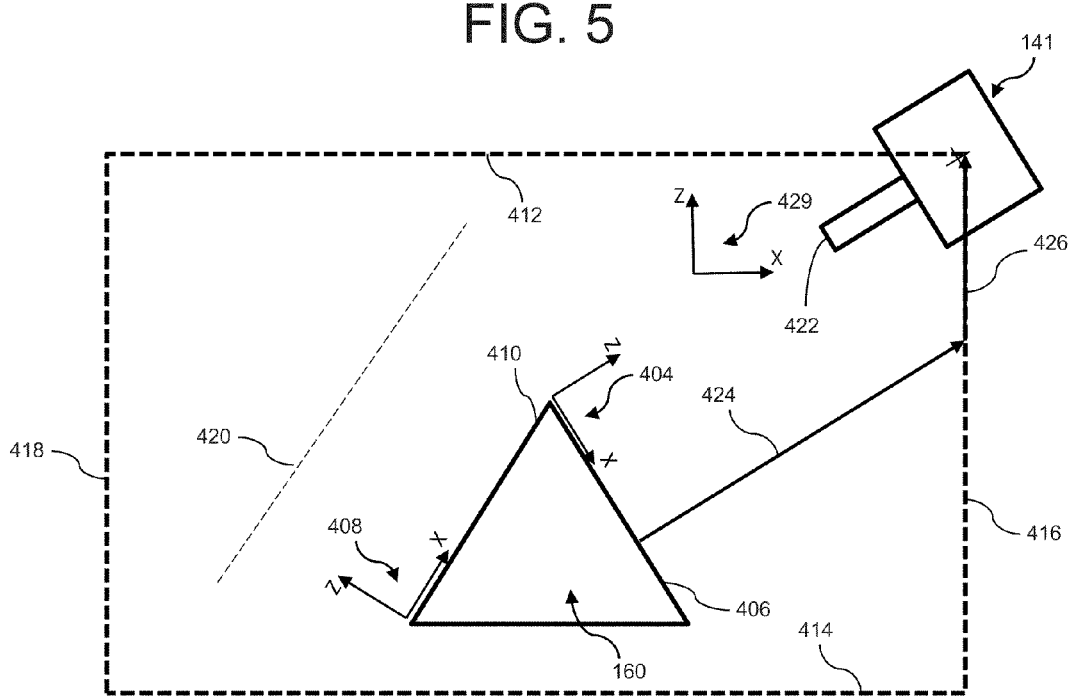

When tool 141 is in the position shown in FIG. 6, it is retracted as far from part 160 as permitted within the machine limits of machine tool system 100. Controller 202 next determines the moves necessary to change the orientation of tool 141 from that shown in FIG. 6 to that shown in FIG. 7, which corresponds to the final orientation of tool 141 when in target position 402 (FIG. 3). To determine the moves necessary to reorient tool 141, controller 202 computes the current orientation of tool tip 422 in second coordinate system 408 when in the orientation of FIG. 6 and the desired orientation of tool tip 422 in second coordinate system 408 when in the orientation of FIG. 7. After these computations are complete, tool 141 is moved to the reoriented position shown in FIG. 7. From this point forward, the movements of tool 141 in this example are movements relative to second coordinate system 408.

It should be understood that the reorientation sequence is only performed if the orientation of tool 141 in start position 400 is different from the orientation of tool 141 in target position 402. If tool 141 has the same orientation in both positions relative to part 160, then no reorientation is necessary, and tool 141 is not retracted to the machine limits in the manner described above with reference to FIGS. 5 and 6.

Instead, controller 202 skips the reorientation sequence and performs the calculations and movements of the retract sequence described below.

Continuing with the example, after tool 141 is reoriented into the orientation of FIG. 7, controller 202 compares the current location of tool tip 422 in second coordinate system 408 to the location of retract plane 420, and determines that tool tip 422 is positioned "below" retract plane 420. In other words, tool tip 422 is not positioned a sufficiently positive distance along the z-axis of second coordinate system 408 (i.e., away from face 410 of part 160) to lie in retract plane 420. Accordingly, controller 202 initially attempts to move tool 141 along tool vector 428, which is defined with respect to the machine coordinate system 429, from the position of FIG. 7 toward retract plane 420. Movement along tool vector 428 is considered ideal movement because it is the most direct path for positioning tool tip 422 into retract plane 420. However, when in the position of FIG. 7, tool 141 is at positive Z limit 412 of machine tool system 100, and cannot be moved farther along the z-axis of second coordinate system 408. As is further described below, controller 202 analyzes tool vector 428 and determines that movement along the z-component of tool vector 428 is not possible because tool 141 is already at positive Z limit 412. Controller 202 then subtracts the z-component from the retract vector (here, the retract vector is tool vector 428), thereby computing a new retract direction toward retract plane 420. Controller 202 compares the required movement in the new retract direction to determine whether other machine limits will be encountered during such movement. As will be further described below, if other machine limits will be encountered, the appropriate component of the retract vector is subtracted, and another new retract direction is computed.

In the worst case situation, controller 202 subtracts all direction components of tool vector 428 because machine limits would be encountered, and determines that tool tip 422 cannot safely be moved to retract plane 420. This situation may cause controller 202 to generate an error and discontinue operation of part program 204. However, as is further described below, controller 202 may alternatively determine whether movement into or above the check plane (not shown) is possible when movement into retract plane 420 is not possible. In other words, if movement into retract plane 420 cannot be achieved within the confines of the machine limits, then controller 202 will compute motion of tool tip 422 into or above the check plane in the manner described above with reference to retract plane 420 to see if such motion is possible while maintaining tool 141 within the machine limits. If so, then controller 202 will generate move commands to position tool tip 422 in the check plane.

In this example, however, only positive Z limit 412 is encountered during computation of movement of tool tip 422 into retract plane 420. After the z-component of tool vector 428 defined with respect to machine coordinate system 429 is subtracted as described above, the new retract direction is along the negative x direction toward negative X limit 418. Controller 202 determines that tool 141 can move in the negative x direction until tool tip 422 reaches retract plane 420 without encountering another machine limit. Thus, after determining whether the plunge sequence described below can be successfully achieved, controller 202 will cause movement of tool 141 along vector 430 from the position of FIG. 7 to the position of FIG. 8 wherein tool tip 422 is in retract plane 420. The retract sequence is complete, and the computations and movements to execute the plunge sequence are now described.

Figure 9:
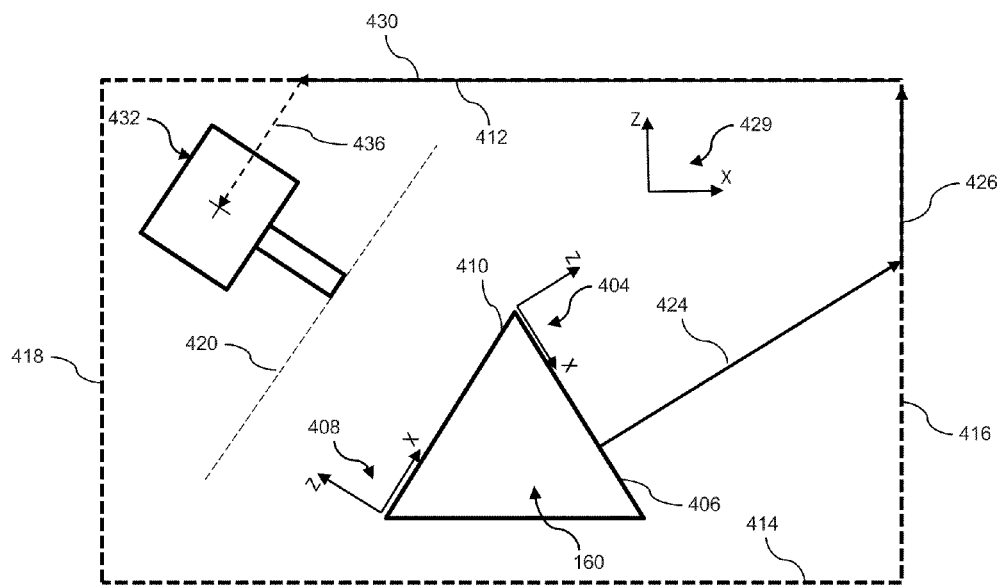
FIG. 9 is a conceptual view of the tool of FIG. 3 in a position calculated during a plunge sequence.
Figure 10:
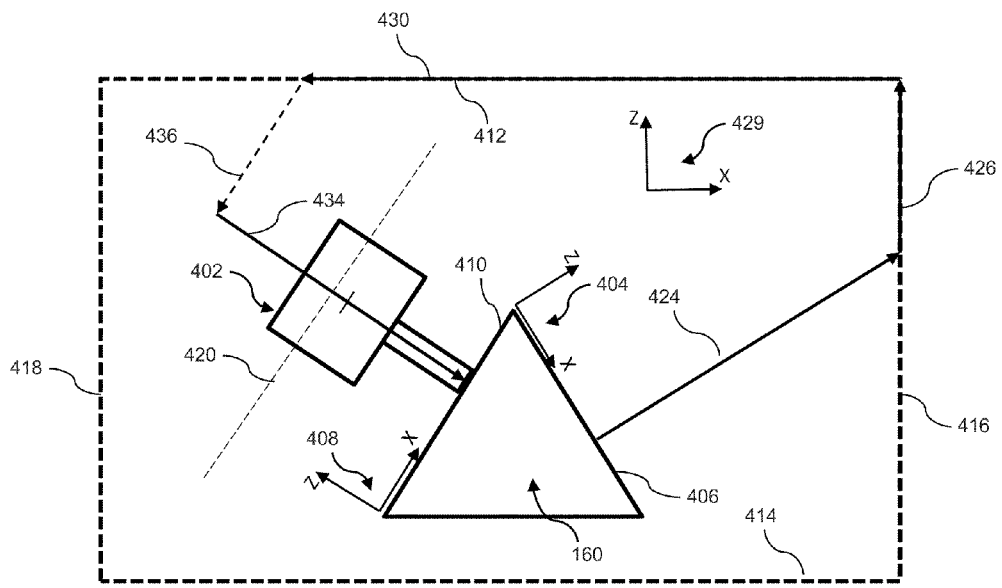
FIG. 10 is a conceptual view of the tool of FIG. 3 in the target position following execution of a plunge sequence.

Referring to FIGS. 9 and 10, tool 141 is shown in the two positions it will assume during execution of the plunge sequence in this example. More specifically, tool 141 is shown in target position 402 in FIG. 10, and position 432 in FIG. 9 from which tool 141 will plunge toward part 160. As will be described in greater detail below, the algorithm executed by controller 202 during the retract sequence to determine safe retract movement of tool 141 from the position of FIG. 7 to the position of FIG. 8 is also used by controller 202 during the plunge sequence to compute the plunge movement of tool 141 from the position of FIG. 9 to the position of FIG. 10. Controller 202, however, computes the sequence of moves needed to safely move tool 141 from target position 402 of FIG. 10 to position 432 of FIG. 9, and stores the moves in reverse order in a movement list so that when the moves in the movement list are executed by machine tool system 100, tool 141 is plunged from position 432 to target position 402. More specifically, just as controller 202 retracted tool 141 from the position of FIG. 7 to retract plane 420 by determining whether movement along tool vector 428 would exceed machine limits and subtracting direction components of tool vector 428 as needed to avoid exceeding machine limits, controller 202 computes how to retract tool 141 (in this example, along a motion vector that is the inverse of the plunge vector 434 shown in FIG. 10) from target position 402 of FIG. 10 to position 432 of FIG. 9 by determining whether machine limits will be encountered and subtracting direction components of the inverse of plunge vector 434 to avoid exceeding those limits. In this example, no machine limits are encountered during the plunge sequence. After controller 202 moves tool 141 from the last position of the retract sequence (FIG. 8) to position 432 (along vector 436), tool 141 is simply moved directly along plunge vector 434 from position 432 of FIG. 9 to target position 402. Thus, the automatic safe repositioning of tool 141 from start position 400 to target position 402 is complete.

Figure 11:
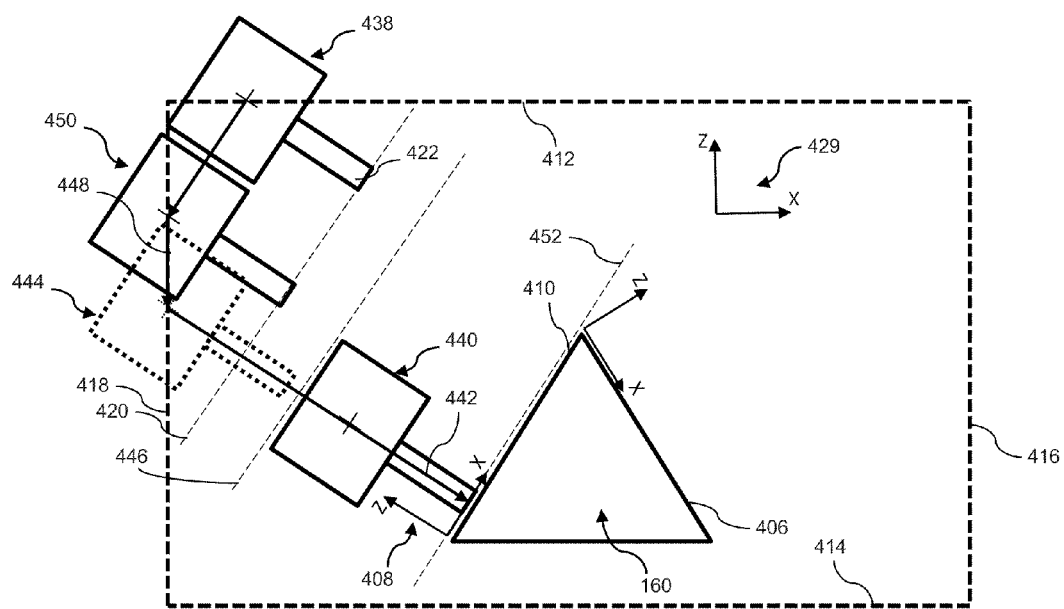
FIG. 11 is a conceptual view illustrating various positions of a tool during a plunge sequence.
Figure 12:
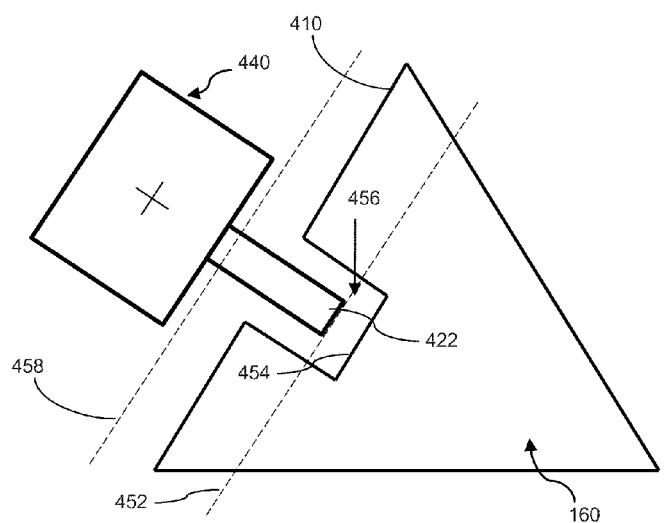
FIG. 12 is a conceptual view of a tool illustrating a check plane relative to a part.

Referring now to FIG. 11, the manner in which controller 202 uses the check plane will be further described. In general, FIG. 11 depicts a plunge sequence wherein tool 141 encounters a machine limit (unlike the example described above with reference to FIGS. 9 and 10). In FIG. 11, position 438 of tool 141 corresponds to the position of tool 141 in FIG. 8. More specifically, tool 141 is shown in position 438 after a retract sequence to position tool tip 422 into retract plane 420. As described above, controller 202 next computes movements for the plunge sequence (i.e., movements from target position 440 to a position wherein tool 141 is in retract plane 420), which are executed in reverse order. During this computation, controller 202 determines that tool 141 can move along the motion vector corresponding to the inverse of plunge vector 442 until tool 141 encounters negative X limit 418 (i.e., position 444 shown in dotted lines in FIG. 11). Controller 202 next determines that when in position 444, tool 141 is not in retract plane 420. Accordingly, controller 202 determines whether tool 141 is at least in or above check plane 446, which in this case is true. As such, position 444 is considered a safe position for tool 141 to traverse during the plunge sequence. Controller 202 nonetheless continues to attempt to move tool 141 to retract plane 420. As negative X limit 418 has been encountered, controller 202 subtracts the negative x-component of the inverse of vector 442 and computes a new motion vector 448 along negative X limit 418. Motion vector 448 permits repositioning of tool 141 into retract plane 420 at position 450. Thus, when the plunge sequence is executed (i.e., the computed motion commands are executed in reverse order), controller 202 will cause movement of tool 141 from position 438 to position 450 (i.e., the transition movement from the last position of the retract sequence to the first position of the plunge sequence), from position 450 to position 444, and finally from position 444 to target position 440.

Although check plane 446 in FIG. 11 is shown above plane 452 in which tool tip 422 resides when tool 141 is in target position 440, in one embodiment of controller 202 the default check plane 446 is plane 452. In other words, when tool tip 422 cannot safely be positioned at a plunge point on retract plane 420, the default operation of controller 202 in such an embodiment is to determine whether tool tip 422 can be safely moved to the position corresponding to the target position 440. In some instances, however, it is desirable to define a check plane that is spaced away from part 160 farther than default check plane 452. For example, in the case of FIG. 12, where tool tip 422 when in target position 440 is positioned near the bottom 454 of a pocket 456 formed in part 160 (i.e., tool 141 extends into a recess formed into surface 410 of part 160), it is desirable to define a check plane 458 spaced farther away from bottom 454 than default check plane 452 to avoid interference between tool 141 and part 160 during repositioning operations.

Figure 13:
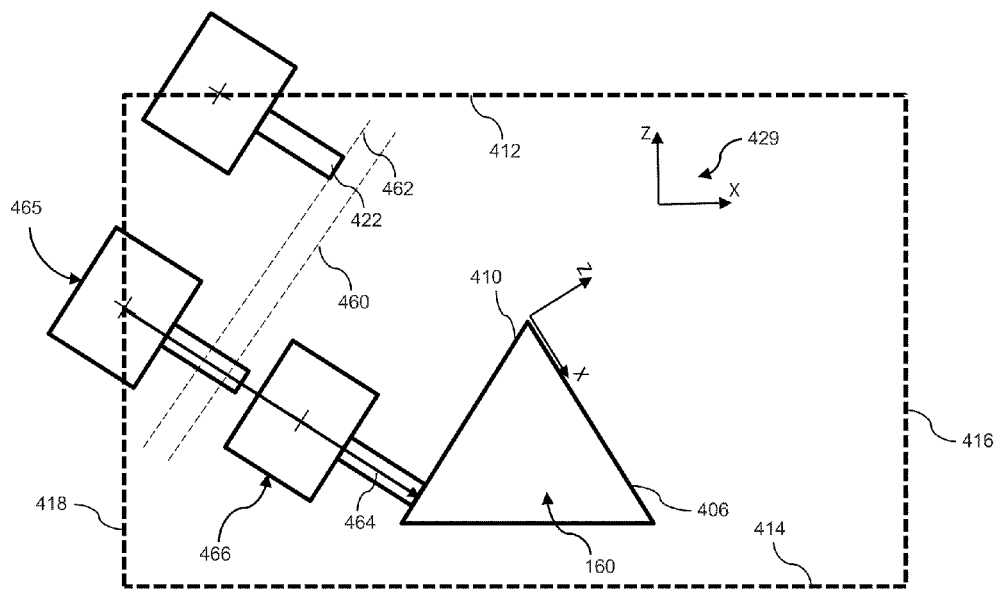
FIG. 13 is a conceptual view illustrating various positions of a tool during an unsuccessful plunge sequence.

FIG. 13 depicts a situation wherein tool 141 cannot be positioned at a plunge point above the defined check plane 460 within the confines of the machine limits. While controller 202 was able to compute movements that maintain tool tip 422 above check plane 460 during the retract sequence (i.e., movements for repositioning the properly oriented tool 141 to a position wherein tool tip 422 is in retract plane 462), safe movement during the plunge sequence (i.e., movement to a position in or above check plane 460 along the inverse of plunge vector 464) is not possible. This demonstrates one characteristic of one embodiment of a controller 202 according to the present disclosure. Specifically, in such an embodiment, controller 202 must be able to compute a movement (which is executed in reverse order) along the inverse of plunge vector 464 (which may or may not be the tool vector) from target position 466 to a position in or above the check plane without encountering machine limits. It should be understood that rather than compute a move for tool 141 in the positive z direction of machine tool system 100 from position 465 to a position above check plane 460, controller 202 will generate an error that the move is unsafe and discontinue operation of part program 204.

Figure 14:
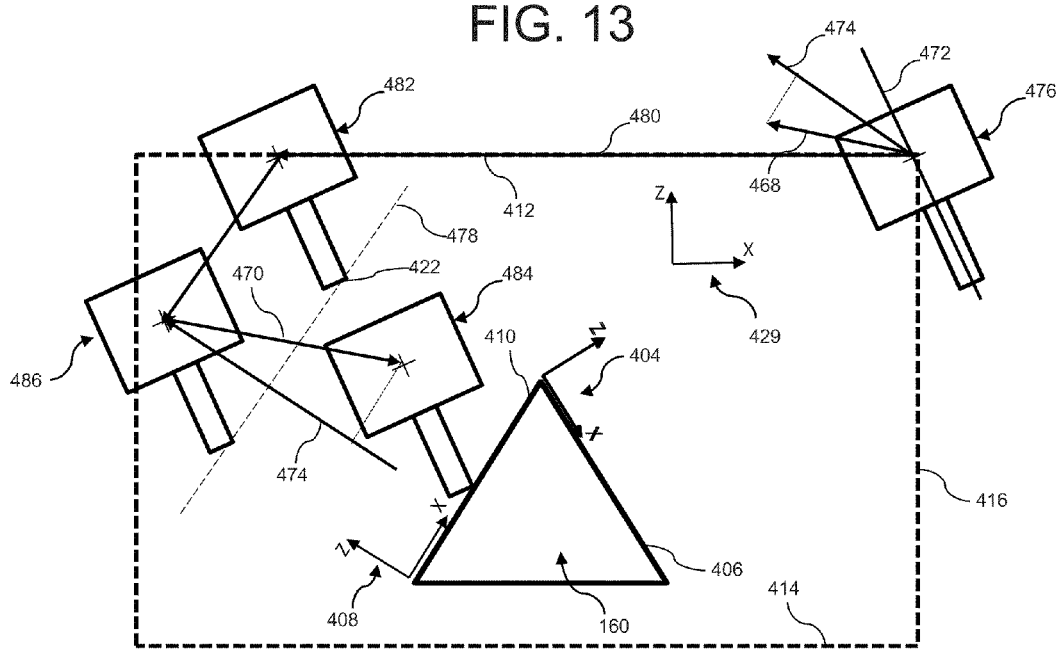
FIG. 14 is a conceptual view illustrating various positions of a tool during a retract and a plunge sequence.

Referring now to FIG. 14, a more generalized version of automatic safe repositioning is shown. More specifically, FIG. 14 depicts a situation wherein tool 141 is repositioned using the algorithms of the present disclosure even though the retract vector 468, the plunge vector 470, the tool vector 472, and the normal vector 474 are all different. As will be apparent from the description below, the algorithms of the present disclosure are generalized sufficiently to generate reorientation, retract and plunge sequences regardless of the orientation of retract vector 468, plunge vector 470, or tool vector 472 in second coordinate system 408. Controller 202 simply attempts to move tool tip 422 to a plunge point on either a retract plane or a check plane along whatever retract vector is provided without violating machine limits, and then attempts to move tool tip 422 to the target position (by computing the movements in reverse) along whatever plunge vector is provided without violating machine limits.

Figures 7, 8:
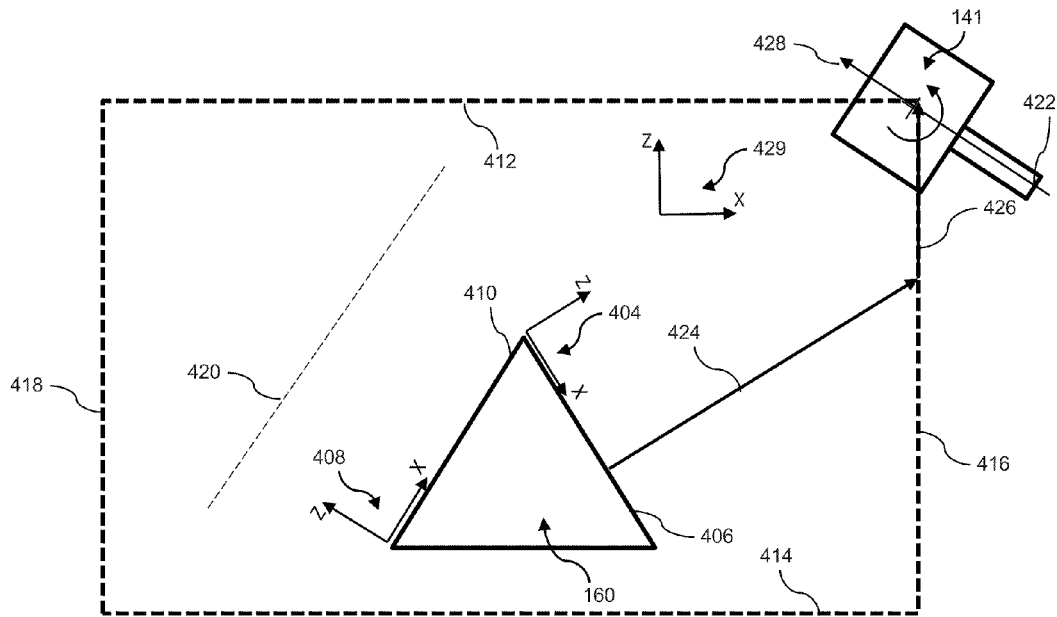
FIG. 8 is a conceptual view of the tool of FIG. 3 in a final position of a retract sequence.

As shown, position 476 of tool 141 corresponds to the reoriented position of tool 141 in FIG. 7. Here, however, instead of using the default retract vector, which is the tool vector when tool 141 is in the start position, controller 202 uses retract vector 468 which has been defined by a user with respect to first coordinate system 404 in the Buffer Off G-code (i.e., G08.2 using parameters A, B and C corresponding to the x, y and z direction cosines, respectively, of the vector as described below). Instead of generating a retract sequence based on normal vector 474 as described above, controller 202 attempts to safely move tool 141 along retract vector 468 to a position wherein tool tip 422 is in retract plane 478. Before computing a retract sequence using retract vector 468, controller 202 determines whether retract vector 468 is valid for moving tool tip 422 into retract plane 478. This determination is performed mathematically by projecting retract vector 468 onto normal vector 474. If the projection is positive (which it will be if retract vector 468 is directed to any point in a hemisphere above retract plane 478), then retract vector 468 is valid (i.e., moving tool 141 along retract vector 468 will eventually cause tool tip 422 to be located in retract plane 478, unless machine limit encounters prevent such movement). Thus, controller 202 computes a move of tool 141 along retract vector 468, which immediately results in an encounter with positive Z limit 412 of machine tool system 100. Controller 202 then subtracts out the z-component of retract vector 468, and computes a new retract vector 480, which corresponds to movement of tool 141 along positive Z limit 412 in the negative x direction of machine tool system 100.

Controller 202 computes that no other machine limits will be encountered by moving tool 141 along new retract vector 480 to position 482 wherein tool tip 422 is positioned within retract plane 478. At this point, the retract sequence is complete.

As is also shown in FIG. 14, instead of using the default plunge vector which is the inverse of the tool vector when tool 141 is in the target position 484, controller 202 uses plunge vector 470 which has been defined by a user in the Buffer Off G-code (i.e., G08.2 using parameters U, V and W corresponding to the x, y and z direction cosines of the vector as described below). As indicated above, the algorithms of the present disclosure do not require a plunge sequence that follows the inverse of normal vector 474. Any user-defined plunge vector may be used, as long as the projection of the plunge vector onto normal vector 474 of retract plane 478 is negative. In other words, any plunge vector that is directed into the hemisphere below retract plane 478 is valid. Plunge vector 470 of FIG. 14 satisfies this condition.

Accordingly, controller 202 uses the same algorithm as described above with reference to the retract sequence to compute the plunge sequence according to the user-defined plunge vector 470. More specifically, in a manner similar to that described with reference to FIGS. 9 and 10, controller 202 computes the sequence of movements required to move tool 141 from target position 484 to position 486, and, assuming the movements can be completed (i.e., tool 141 can at least be moved to a check plane (not shown) without encountering machine limits), causes machine tool system 100 to execute the computed movements in reverse order, thereby plunging tool 141 from position 486 to target position 484 along plunge vector 470. When using user-defined plunge vector 470 to perform these computations, controller 202 determines whether movement from target position 484 along the inverse of plunge vector 470 to retract plane 478 will result in a machine limit encounter. If so, but tool 141 is at least above the check plane (not shown), the appropriate direction component of motion is subtracted from plunge vector 470, and the resulting motion vector is followed toward retract plane 478 unless another machine limit is encountered, in which case another direction component is subtracted and the process is repeated until a motion sequence ending in a tool 141 position on retract plane 478 is computed or an error is generated because such a position cannot be reached without exceeding all machine limits. In the example shown, no machine limits are encountered. When the motion commands of the retract sequence and the plunge sequence are executed, controller 202 causes machine tool system 100 to move tool 141 from position 476, to position 482 (the last position of the retract sequence), then to position 486 and finally to target position 484 along plunge vector 470.

Figure 15:
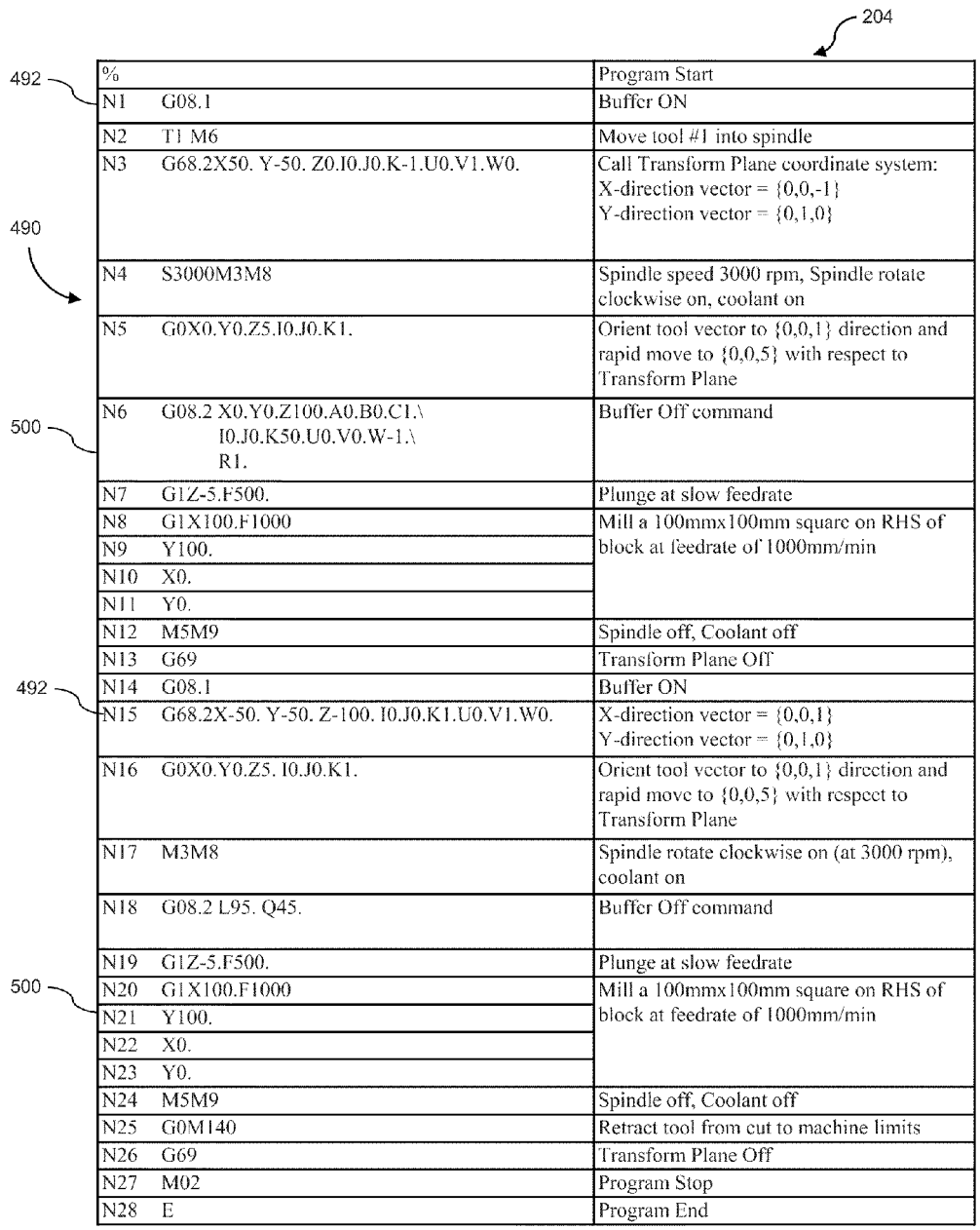
FIG. 15 is a portion of an exemplary part program for execution by the machine tool system of FIG. 1.

As indicated above, the automatic safe repositioning algorithms of the present disclosure compute tool movements before causing machine tool system 100 to execute those movements. This is accomplished by buffering the computed sequence of moves until controller 202 determines that tool 141 can be safely repositioned, and then executing the buffered moves. It should be understood, however, that the computations and buffering are performed at run-time, when part program 204 is actually being executed by controller 202. Accordingly, part program 204 must include commands to indicate when to begin such buffering and when to stop buffering. FIG. 15 depicts a portion of a part program having such automatic safe repositioning commands. Part program 204 includes block 490, which includes a G08.1 Buffer On command 492 followed by various machine and motion M and G code commands, and a G08.2 Buffer Off command 500. Upon executing part program 204, when controller 202 encounters G08.1 Buffer On command 492, controller 202 executes the algorithms described below and processes the intermediate commands internally without causing movement of tool 141 until encountering G08.2 Buffer Off command 500. As indicated above, the algorithms of the present disclosure can be used with part programs 204 that are created independently of machine configuration 208, the setup location of part 160, and the setup (length) of tool 141.

It should be further understood that although the following sections describe a plurality of different algorithms for performing the various functions of the present disclosure, more or few algorithms may be employed by one skilled in the art to enable these functions. Indeed, all of the algorithms may properly be viewed as a single algorithm. The manner in which the functions are separated into the following algorithms is primarily to facilitate the description of the concepts of the present disclosure.

Figure 15A:
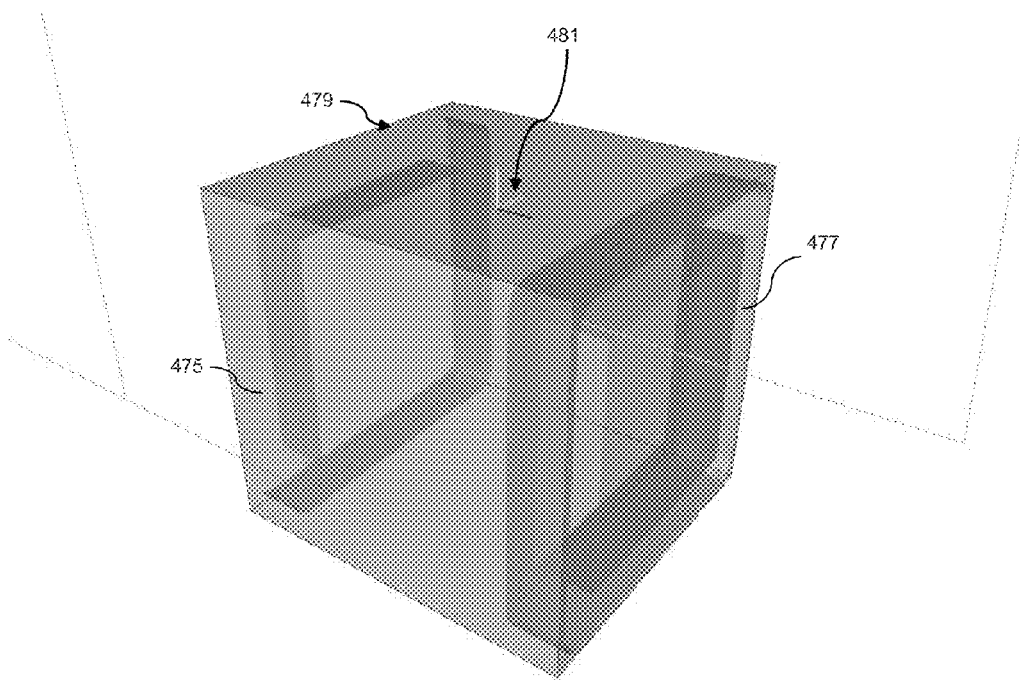
FIG. 15A is a perspective view of a part machined using the part program of FIG. 15.

In this example, part program 204 of FIG. 15 is written to cut two squares 475, 477 on the sides of a cube 479 (with dimensions of 100×100×100 mm) as depicted in FIG. 15A. Execution of part program 204 with the algorithms described below will result in safe reorientation of tool 141 after cutting square 477 and safe repositioning of tool 141 to a machine position for cutting square 475. In preparing part program 204, the programmer need not consider whether any of the repositioning sequences will encounter a machine limit causing program termination. The algorithms of the present disclosure automatically compute the repositioning sequences and return an error only if repositioning cannot be achieved while remaining a safe distance from part 160. As will be apparent to one skilled in the art, part program 204 does not include rotary axis-specific commands (e.g., an A90 command which may be used to command 90 degree rotation of an A-axis). Thus, when program 204 is loaded into and executed by a 5-axis machine tool system 100 with a motion control system 200 executing the algorithms of the present disclosure and the algorithms described in U.S. patent application Ser. No. 11/833,971, filed Aug. 3, 2007, titled "GENERALIZED KINEMATICS SYSTEM," (hereinafter, "the Generalized Kinematics patent application"), the disclosure of which is expressly incorporated by reference herein, each such machine tool system will safely cut identical parts even if their axes configurations and work volumes (i.e., machine axis limits) are different.

Without the benefit of these algorithms, the programmer must insert the sequences of moves needed to reorient and reposition the tool safely. As indicated above, the programmer knows that such moves may result in errors as exceeding machine limits if the programmed moves are too conservative (i.e., designed to maintain too much distance between part 160 and tool 141 during repositioning). Thus, programmers may program moves that are less conservative, but result in unintended contact with part 160 or components of machine tool system 100, which is, of course, even more undesirable. As described below, with the algorithms of the present disclosure, the programmer is relieved of the responsibility of inserting repositioning moves into part program 204, and can even specify a retract plane that is outside the machine limits that does not result in errors or tool crashes.

Figure 16:
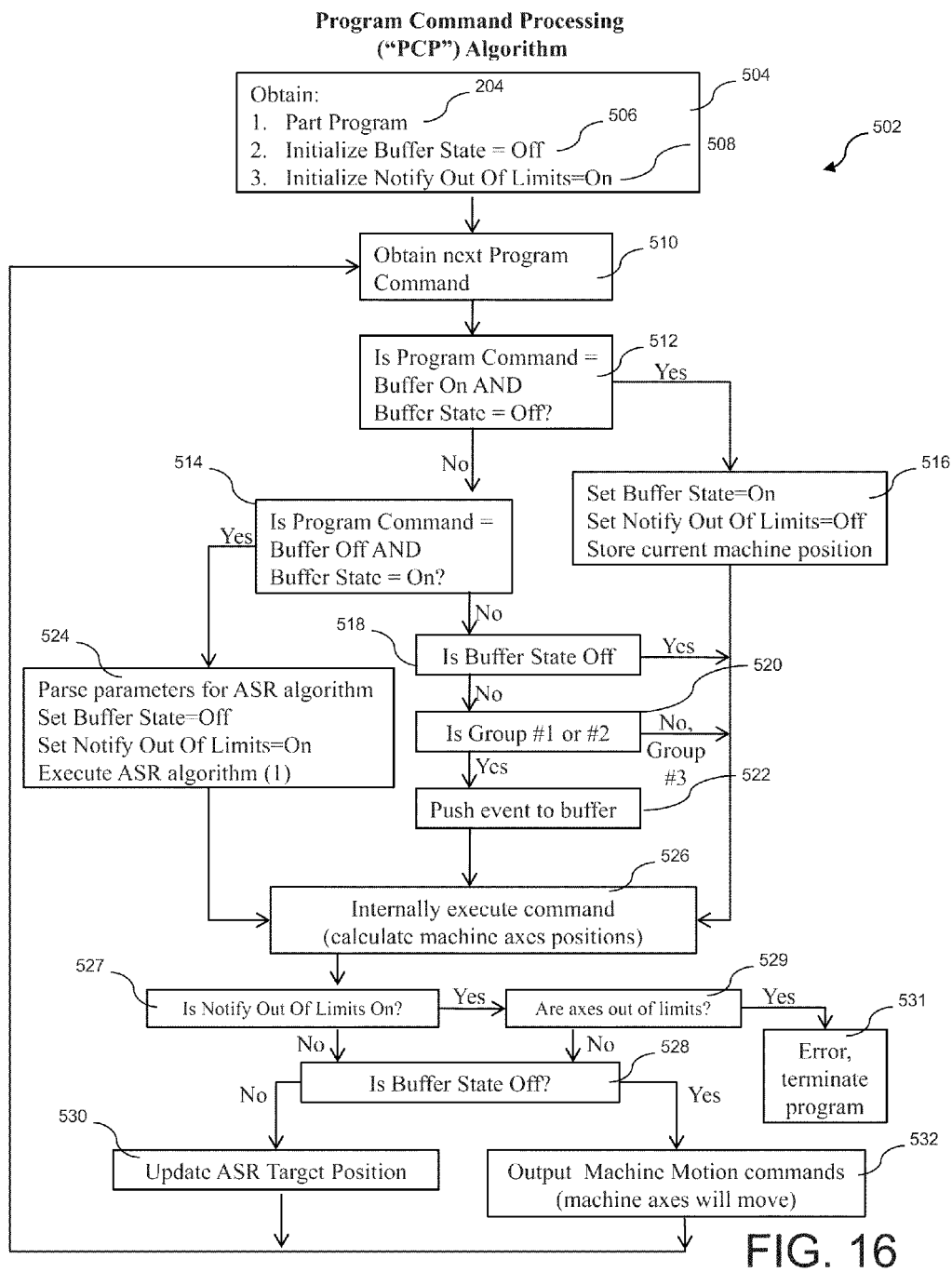
FIG. 16 is a block diagram of a Program Command Processing ("PCP") Algorithm according to one embodiment of the present disclosure.

Referring now to FIG. 16, a Program Command Processing ("PCP") Algorithm 502 is depicted, which is executed by controller 202 when processing part program 204. Block 504 represents the inputs to controller 202 at run time, which includes part program 204, an initial Buffer State 506 of Off, and an initial state of the Notify Out Of Limits variable 508 of On. After these initial states are established, controller 202 begins processing programming commands of part program 204 as indicated by block 510. During processing, four main execution paths are possible for PCP Algorithm 502. One primary mode of processing is normal program execution, wherein automatic safe repositioning is not necessary and hence is not activated. During normal program execution, Buffer State 506 is Off and the variable Program Command is neither equal to Buffer On, which occurs when controller 202 is processing a G08.1 Buffer On command 492, or Buffer Off, which occurs when controller 202 is processing a G08.2 Buffer Off command 500. In other words, Program Command is not a G08.1 Buffer On command 492 or a G08.2 Buffer Off command 500 and Buffer State 506 is Off. As described below, the result of these conditions is that during normal program execution, the machine positions specified in part program 204 are outputted to machine tool system 100 for motion (i.e., machine axes movements are executed as they are encountered during program execution). More specifically with reference to FIG. 16, after obtaining a command from part program 204 (block 510), controller 202 determines that Program Command does not equal Buffer On (block 512). At block 514, controller 202 also determines that Program Command does not equal Buffer Off (and Buffer State 506 is not On). Then, at block 518, controller 202 determines that Buffer State 506 is Off (Buffer State 506 has not been changed from its initialized state (block 504) of Off), and proceeds to block 526. As is further described below, at block 526 controller 202 internally computes the required machine axes positions to achieve the programmed tool position and orientation using a kinematics model of the machine as is described in the Generalized Kinematics patent application. If Notify Out Of Limits 508 is On (block 527), which it is for this execution path, controller 202 checks whether the computed machine axes are out of limits in block 529. If so, controller 202 generates an error (block 531) and terminates program execution. Otherwise, the result of block 528 is yes (i.e., Buffer State 506 is still Off), and controller 202 outputs the motion commands specified by part program 204 to machine tool system 100 at block 532. Controller 202 then returns to block 510 to begin processing the next command of part program 204 in the manner described above.

Thus, unless a G08.1 Buffer On command 492 or a G08.2 Buffer Off command 500 is encountered, controller 202 will simply advance through blocks 512, 514 and 518 to process the command in a standard fashion, generating errors (blocks 529, 531) if the commands result in machine limit violations, and outputting commands (block 532) if machine limits are not encountered.

Another execution path of PCP Algorithm 502 is followed when Program Command equals Buffer On (i.e., after a G08.1 Buffer On command 492 is encountered in part program 204). As shown in FIG. 16, when Program Command equal Buffer On, and Buffer State 506 is Off (as it is initially), controller 202 proceeds from block 512 to block 516 where Buffer State 506 is set to On. Additionally at block 516, Notify Out Of Limits 508 is set to Off and the current machine position is stored for potential use as the start position of tool 141 in the algorithms described below, but only if no Group 2 commands are buffered. As explained herein, Group 2 commands move the axes of machine tool system 100. In some cases, controller 202 knows what the command does and where it will move the axes, but in other cases, the command is not known by the controller. For those commands, controller 202 has to send the command to a logic controller 539 (see FIG. 2) (i.e., an interface to the machine components and the physical systems), wait until logic controller 539 signals it has completed the command, and then pick up the real-time machine position.

More specifically with reference to FIG. 16, controller 202 proceeds to block 526 where controller 202 internally computes the required machine axes positions to achieve the programmed tool position and orientation using a kinematics model of the machine as described in the Generalized Kinematics patent application referenced above. At block 527, controller 202 determines that Notify Out Of Limits 508 is not On. Then, at block 528, controller 202 determines that Buffer State 506 is not Off (it was set to On at block 516). Thus, controller 202 updates the target position (to be the current machine position stored at block 516) for ASR Algorithm 540 at block 530 and obtains the next command of part program 204 at block 510. At block 512, controller 202 determines that Buffer State 506 is not Off, and proceeds to block 514 where it determines that Program Command does not equal Buffer Off. At block 518, controller 202 determines that Buffer State is not Off and checks whether the command currently being processed is a Group 1 or Group 2 command (which are fully described below). If so, controller 202 stores the command in an event buffer as indicated by block 522. Otherwise, the command is considered a Group 3 command and is internally executed by controller 202 at block 526. More specifically, controller 202 internally computes the required machine axes positions to achieve the programmed tool position and orientation using a kinematics model as described in the Generalized Kinematics patent application reference above. As Notify Out Of Limits 508 is still Off, controller passes from block 527 to block 528 where it determines that Buffer State 506 is still not Off. Controller 202 again updates the target position if necessary (block 530). As will become more apparent from the description below, the target position is the target position (e.g., position 402 of FIG. 3) used by ASR Algorithm 540 of FIG. 17. Controller 202 again obtains the next command in part program 204 at block 510 and continues the process of buffering Group 1 and Group 2 commands, internally executing Group 3 commands, and updating the target position.

Figure 17:
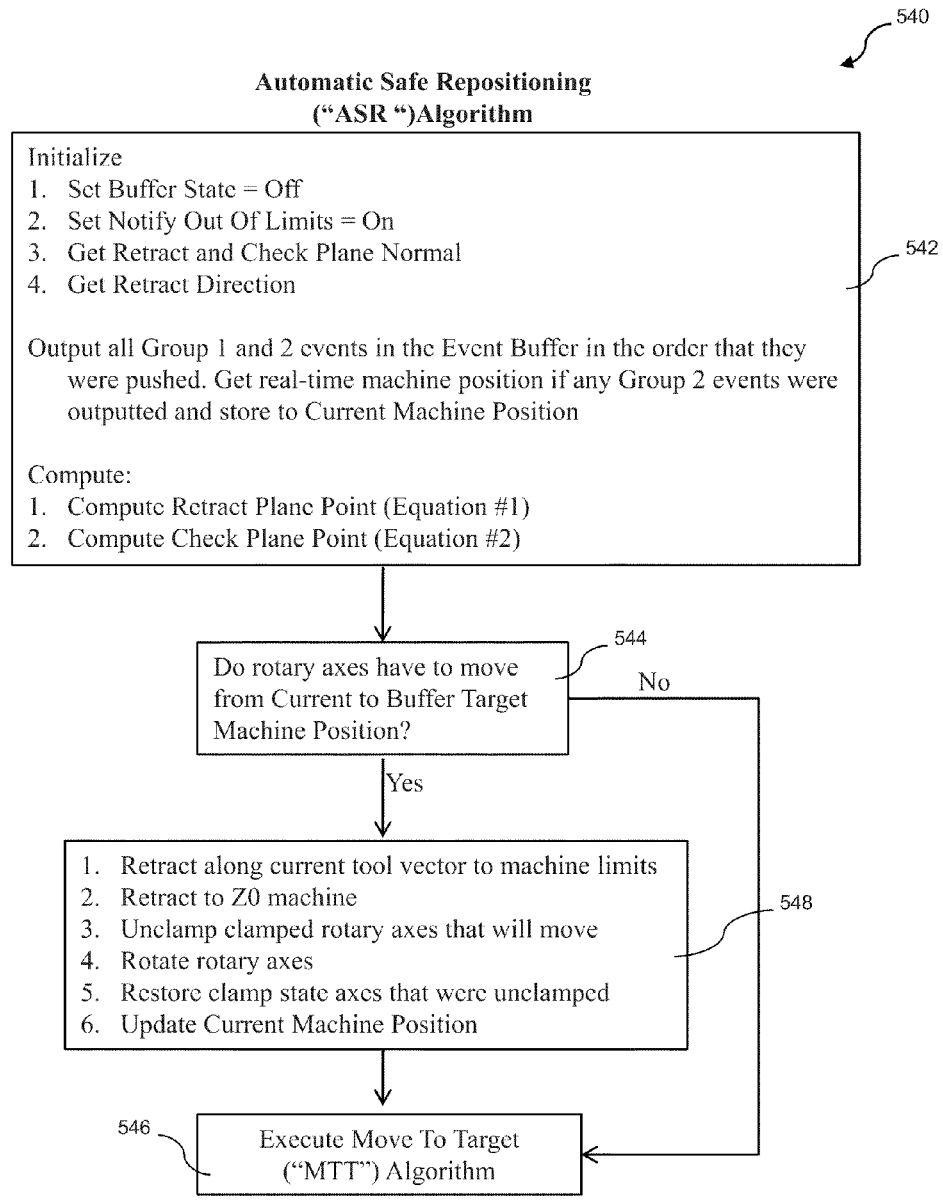
FIG. 17 is a block diagram of an Automatic Safe Repositioning ("ASR") Algorithm according to one embodiment of the present disclosure.

Eventually, controller 202 will encounter a G08.2 Buffer Off command 500 as it continues to process commands of part program 204 in the manner described above. When it does, the outcome of block 514 will be yes, and controller 202 advances to block 524 where Buffer State 506 is turned Off, Notify Out Of Limits 508 is set to On, and ASR Algorithm 540 of FIG. 17 is called to begin the process of safely repositioning tool 141.

The command grouping described below is part of the command buffering feature of the present invention, which provides added flexibility to the creator of part program 204. As indicated above, the programmer may select any block to begin command buffering (with G08.1 Buffer On command 492) and any subsequent block to end such buffering (with G08.2 Buffer Off command 500). The repositioning algorithms described below operate on the current position of tool 141 when buffering is turned on. All moves commanded by part program 204 between G08.1 Buffer On command 492 and G08.2 Buffer Off command 500 are internally executed by controller 202, and are permitted to be outside of machine limits because Notify Out Of Limits 508 is set to Off when Buffer State 506 is On. However, the final target position (block 530) must be within machine limits as Notify Out Of Limits 508 is set to On when Buffer State 506 is returned to Off (block 524) prior to executing ASR Algorithm 540. If the final target position is outside machine limits, the algorithm will generate an error and terminate execution of the program. All commands encountered are classified into three groups. Group 1 commands include commands that activate devices or systems on machine tool system 100, but do not require movement of axes of machine tool system 100. Examples of Group 1 commands are commands that initiate pallet changes, axis clamping, coolant on/off, and spindle on/off. These commands are buffered during the buffering process and executed prior to the reorientation process and safe repositioning tool 141 moves.

Group 2 commands are commands that are executed in the software in the block sequence of part program 204, but not executed on machine tool system 100 until prior to executing the computed tool 141 moves. These commands, when executed, generate machine motion and activate a device or system of machine tool system 100. Examples of Group 2 commands include tool change commands and zone change commands. For an example tool change command, the machine tool will move the axes to a tool change position, then the logic controller 539 will index a tool magazine to the new tool. It then exchanges tool 141 in spindle 138 with the tool in the magazine that was indexed to the exchange position after which the logic controller 539 signals controller 202 that the tool change is complete. As described in the tool change command example, Group 2 commands will execute a secondary system of machine tool system 100 (e.g., index tool magazine and exchange tool to spindle) and move the machine axes. For some Group 2 commands, controller 202 will know what the command does and where it will move the axes to before issuing the command to the logic controller 539. However, for some other commands, the command is not known by controller 202; it is known only by the logic controller 539, which is the interface to the secondary machine components and physical systems. For those commands, controller 202 must send the command to the logic controller 539, wait until logic controller 539 completes the command, then pick up the real-time machine position because it does not know ahead of time what the command will do and where the logic controller 539 will move the axes.

Group 3 commands are also internally executed in the software in the block sequence of part program 204. Group 3 commands are motion related commands that do not activate secondary machine devices or systems controlled by the logic controller 539. Examples include rapid and linear interpolation moves (G0, G1), arc commands (G02/G03), transform plane activation/cancel, drill cycles, etc. In general, controller 202 generates transition moves from the start position (i.e., the current position of tool 141 just before a G08.1 Buffer On command 492 or the machine position after executing Group 2 commands, prior to computing the tool 141 moves associated with the reorientation sequence and the retract and plunge sequences) to the final position of tool 141 generated from Group 2 and Group 3 commands encountered in part program 204 before encountering the G08.2 Buffer Off command 500.

Referring now to ASR algorithm 540 of FIG. 17, block 542 begins the reorientation sequence by initializing a number of variables and computing the location of points on the retract and check planes (note that a plane is fully defined by specifying a point that lies in the plane and a normal direction perpendicular to the face of the plane). As shown, controller 202 initializes Buffer State 506 to Off and Notify Out Of Limits 508 to On. Controller 202 outputs to logic controller 539 all Group 1 and Group 2 events from the event buffer in the order in which they were stored during execution of PCP Algorithm 502 of FIG. 16. By outputting the buffered Group 1 and Group 2 commands, controller 202 causes logic controller 539 to execute the commands, thereby generating the appropriate machine axes motion (for Group 2 commands) and/or activating the appropriate machine systems (for both Group 1 and Group 2 commands). It should be understood, however, that in outputting these commands, controller 202 evaluates the state of the event (i.e., the current state of a machine system such as a coolant system) to avoid unnecessary toggling of the event. More specifically, if, for example, several tool changes were commanded during the buffering process (Buffer State 506 of On), then only the last tool call would be executed prior to computing the moves associated with the reorientation sequence and the retract and plunge sequences.

Controller 202 also obtains the current machine position (i.e., the position of tool 141 after execution of the outputted Group 2 commands). For example, a Group 2 tool change command may have been executed upon entry of block 542 of FIG. 17, thereby changing the start position of tool 141 for ASR Algorithm 540. Controller 202 stores the current machine position as the variable Current Machine Position. Controller 202 also obtains the retract and check plane Normal vector which is by default along the tool vector if the R parameter is not specified in the G08.2 Buffer Off command 500, as is further described herein. If the R parameter is specified with a 1 (R1) in the G08.2 Buffer Off command 500, controller 202 will align the retract and check plane Normal vector with the program's current coordinate system's z-axis direction. Controller 202 also obtains the retract and plunge vectors, which may be set by default or specified in the G08.2 command with additional parameters described herein. Both the retract and check planes share the same normal vector, otherwise, if they did not, the planes would intersect part of and the check plane would be above the retract plane, thereby generating an error condition as is further described below.

Finally, at block 542 controller 202 computes the retract plane point and the check plane point. More specifically, controller 202 uses Equation 1 (described below) to determine the location of the retract plane point, and the check plane point is computed using Equation 2 (described below).

Equation 1: If the Retract Distance L is specified as an input parameter from part program 204 with the G08.2 Buffer Off command 500, then Retract Plane Point=Target Point+Retract Distance from Target*Retract Direction Vector. Otherwise, if the point is explicitly specified in part program 204 with the G08.2 Buffer Off command 500 using parameters X, Y and Z corresponding to the x, y and z position in the current coordinate system, Retract Plane Point (X,Y,Z)=Point specified in part program 204. If neither Retract Distance L nor Retract Plane Point (X,Y,Z) are specified with the G08.2 Buffer Off command 500, then controller 202 uses a Retract Distance L of infinity, thereby setting a Retract Plane an infinite distance from the Target point in the Retract Direction.

Equation 2: If the Check Plane Distance Q is specified as an input parameter from part program 204 with the G08.2 Buffer Off command 500, then Check Plane Point=Target Point−Check Plane Distance from Target*Plunge Direction Vector. Otherwise, if the point is explicitly specified in part program 204 with the G08.2 Buffer Off command 500 using parameters I, J and K corresponding to the x, y and z position in the current coordinate system, Check Plane Point=Point (I,J,K) specified in part program 204. If neither Check Plane Distance Q nor Check Plane Point (I,J,K) are specified with G08.2 Buffer Off command 500, then controller 202 uses a Check Plane Distance Q of zero, thereby setting the Check Plane to contain the Target Point.

At block 544, controller 202 determines whether, based on the current tool vector and the tool vector associated with the target position, any of the rotary axes of tool 141 must be reoriented. If no reorientation is necessary (i.e., tool 141 is already in the target orientation), then controller 202 executes the Move To Target ("MTT") Algorithm 550 of FIG. 18 as indicated by block 546. If, on the other hand, tool 141 must be reoriented as in the example described above with reference to FIGS. 5-7, then controller 202 executes the steps identified in block 548.

The first step of the reorientation sequence of block 548 corresponds to the description above with reference to FIG. 5, wherein controller 202 retracts tool 141 along the current tool vector until tool 141 reaches a limit (e.g., positive X limit 416) of machine tool system 100. After tool 141 reaches a machine limit, controller 202 causes tool 141 to be moved along the limit until tool 141 reaches positive Z limit 412 of machine tool system 100 ("Retract to Z0 machine") as depicted in FIG. 6. In this manner, maximum clearance is provided between tool 141 and part 160. Controller 202 next determines the moves necessary to change the orientation of tool 141 from the current position to that of the target position. The orientation of tool 141 in the target position is specified by the user for example by rotary axes positions of by specifying the tool vector in part program 204. Controller 202 then computes the required machine axes positions to achieve the programmed tool position and orientation using a kinematics model of machine tool system 100 as described in the Generalized Kinematics patent application referenced above. Controller 202 then causes machine tool system 100 to unclamp any rotary axes of tool 141 which must be moved to accomplish the computed reorientation. Controller 202 outputs motion commands to execute axis rotation and reorient tool 141, restores the clamped states of the unclamped axes, and updates Current Machine Position to reflect the new orientation of tool 141. Upon completion of the steps of block 548, controller 202 executes MTT Algorithm 550 of FIG. 18 as indicated by block 546.

Figure 18:
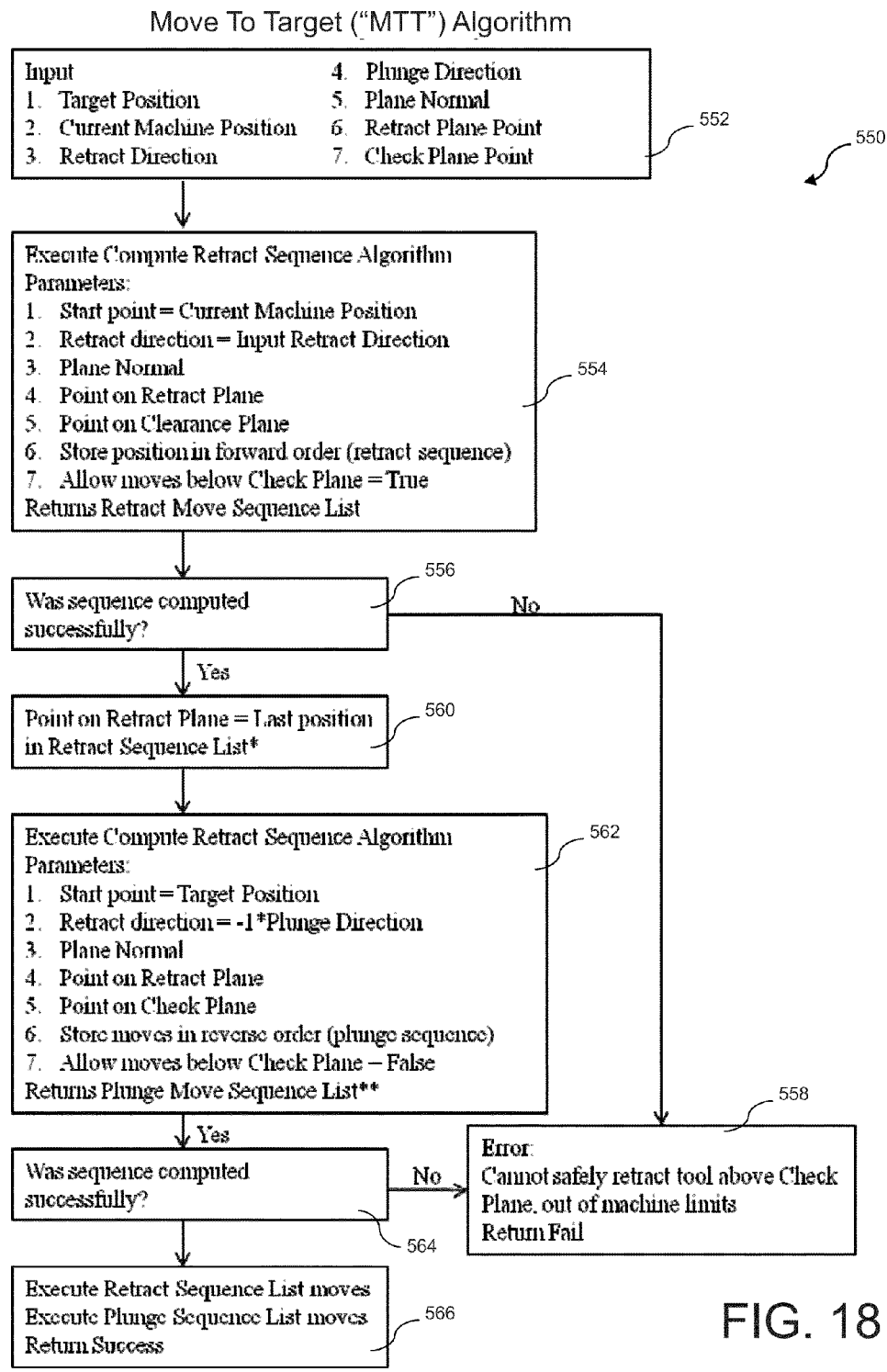
FIG. 18 is a block diagram of a Move To Target ("MTT") Algorithm according to one embodiment of the present disclosure.

Referring now to FIG. 18, block 552 lists inputs to MTT Algorithm 550 including the target position for tool 141, the Current Machine Position (from block 542 of FIG. 17), the retract direction (from block 542 of FIG. 17), the plunge direction (which may be specified in G08.2 Buffer Off command 500 using parameters U, V and W, but is, by default (i.e., when U, V and W are not specified), the inverse of the tool vector when tool 141 is in the target position), the plane normal (from block 542 of FIG. 17) as described above, the retract plane point (as computed using Equation 1 described above), and the check plane point (as computed using Equation 2 described above). Using these inputs, controller 202 next executes the Compute Retract Sequence ("CRS") Algorithm 600 of FIG. 19 as indicated by block 554. In general, CRS Algorithm 600 provides the functionality of computing movement of tool 141 such that no machine limits are exceeded (i.e., to avoid generating errors). This functionality is described in detail below. CRS Algorithm 600 computes movements of tool 141 during the retract sequence described above. Block 556 represents the determination by controller 202 of whether tool 141 could be moved to or above the retract plane (or at least the check plane) without exceeding any of the machine limits. If the retract sequence was not successful, controller 202 causes machine tool system 100 to display an error indicating that tool 141 cannot be safely repositioned as indicated by block 558.

If the retract sequence was computed successfully, then algorithm 550 proceeds to block 560. In block 560, the point on the retract plane for the plunge sequence is set to the last position calculated for the retract sequence. Thus, if the retract sequence did not reach the retract plane (but is at or above the check plane), a move to the position above the target point will be in a plane parallel to the retract and check planes if no machine limits are encountered when computing the plunge sequence. Next, at block 562, controller 202 begins execution of the plunge sequence, which is described in detail below. As mentioned above, the CRS Algorithm 600 used by controller 202 to compute the sequence of moves in the retract sequence is the same algorithm used by controller 202 to compute the sequence of moves in the plunge sequence. This is evident in FIG. 18 in that CRS Algorithm 600 is called at block 554 (the retract sequence) and at block 562 (the plunge sequence). The move commands computed during the plunge sequence, however, are stored in reverse order to their computed order in the MTT Algorithm 550. In other words, controller 202 determines the moves necessary for repositioning tool 141 from the target position to the retract plane point, and then executes those moves in reverse to plunge tool 141 from the retract plane point, toward part 160, into the target position. When executed during the plunge sequence, CRS Algorithm 600 also assumes that the end point of tool 141 (i.e., the beginning point for movement in the plunge direction when the plunge sequence moves are executed in reverse) is the retract plane point. Although the retract sequence described below generally attempts to position tool 141 at the retract plane point, that is not always the case. In some instances, tool 141 will already be at or "above" the retract plane at the beginning of the retract sequence. In that situation, the CRS Algorithm 600 is not executed because tool 141 is already in a safe position. Alternatively, in other situations it is not possible to move tool 141 to at or "above" the retract plane without exceeding the machine limits. CRS Algorithm 600 may instead move tool 141 to a position "below" the retract plane point, as long as that position is at least at or above the check plane. Thus, it is possible that the position of tool 141 at the end of the retract sequence may not correspond to the retract plane point. As indicated above, block 560 of FIG. 18 addresses this possibility by setting the retract plane point (i.e., the end point of the plunge sequence, which is the start point for the plunge move) to the last position computed in the retract sequence. In other words, during the plunge sequence, CRS Algorithm 600 treats the last position of tool 141 (above, below, or at the retract plane) as the retract plane point.

If controller 202 determines that the plunge sequence cannot be executed within the limits of machine tool system 100, then the result of block 564 will be generation of an error message at block 558. On the other hand, if the computations of the plunge sequence remain within the machine limits, controller 202 outputs move commands that cause machine tool system 100 to move tool 141 through the retract sequence and the plunge sequence to the target position as indicated by block 566. Control then returns to block 524 of PCP Algorithm 502 (FIG. 16) as described below.

Returning to block 554 of FIG. 18, for the retract sequence, CRS Algorithm 600 begins by setting the start point equal to the Current Machine Position and the retract direction equal to the input retract direction. It should be understood that the retract direction vector is established at block 542 of ASR Algorithm 540 as either being user-specified in part program 204 or a default vector (i.e., the tool vector of tool 141) if no user-specified vector is provided. Indeed, ASR Algorithm 540 computes or sets the retract vector, the plunge vector, the retract plane point, the check plane point, and the Plane Normal based on whether these items are user-specified in part program 204 or not, in which case default values are used as explained herein. MTT Algorithm 550 and CRS Algorithm 600 simply obtain the previously established (i.e., user-specified or default) definitions. Controller 202 also obtains as inputs the plane normal, the retract plane point, and the check plane point. Controller 202 is also initialized for storing the computed moves in the forward direction. Finally, the variable of allowing moves below the check plane is set to true, and CRS Algorithm 600 of FIG. 19 is initiated.

Figure 19:
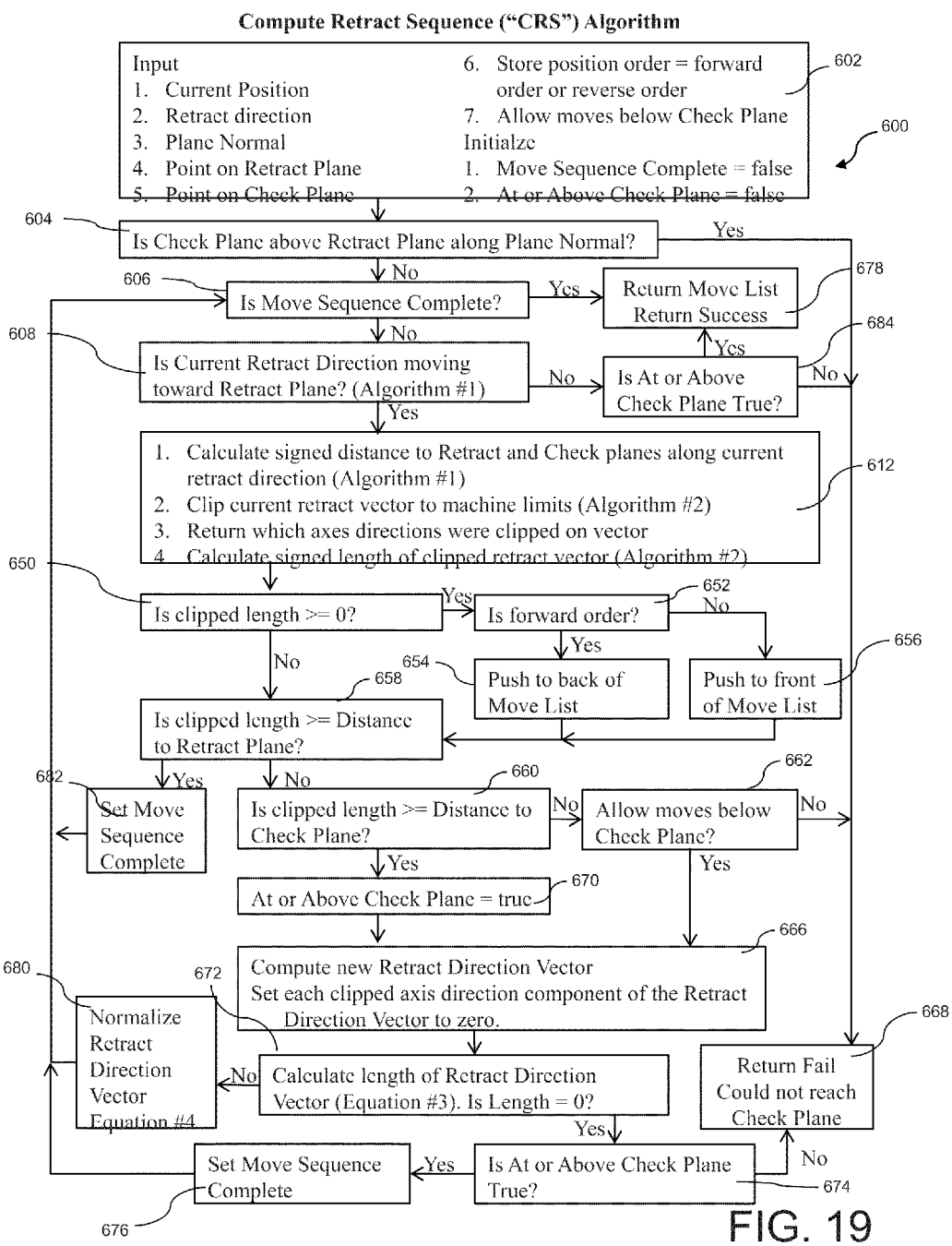
FIG. 19 is a block diagram of a Compute Retract Sequence ("CRS") Algorithm according to one embodiment of the present disclosure.

Referring now to FIG. 19, in addition to setting the above-described initial states and obtaining inputs, controller 202 sets the variables Move Sequence Complete and At or Above Check Plane equal to false as indicated in block 602. At block 604, controller 202 determines whether the check plane (which is either user-specified or defined by default as the position of the tool tip when tool 141 is in the target position) is at or above the retract plane along the plane normal. Initially, the result of block 604 is no, and controller 202 determines at block 606 whether the move sequence (in this case the retract sequence) is complete. Again, initially the result of block 606 is no. Controller 202 next determines at block 608 whether the current retract direction will move tool 141 toward the retract plane. This is accomplished using Algorithm 610

Algorithm 610 (set forth below) is used by controller 202 to compute the intersection point of and distance from a point on a ray (here, the Retract Direction Vector), along the ray's direction vector to a plane defined by a point on the plane and a normal vector. If Algorithm 610 returns a 0 integer, this indicates that the ray is parallel to the plane (i.e., the ray is perpendicular to the plane normal vector) and cannot intersect the plane at a point. Otherwise, Algorithm 610 returns the intersection point, the signed distance from the ray point to the plane, and sign of the dotproduct of the ray direction and the plane normal vector, which indicates whether the ray is pointing away from the positive face of the plane defined by the normal vector. The sign of the dotproduct is used to determine whether the Retract Direction Vector is moving toward the Retract Plane or not. If the sign of dDistanceToPlaneAlongRay (shown below) is positive, then ptPointOnRay is on the negative side of the plane with respect to the Plane Normal. A negative value indicates that the input position is above the input plane, which is used to check if the current tool tip position is above the Check Plane or the Retract Plane.

One embodiment of Algorithm 610 is provided below.

```
        integer ComputeIntersectionOfRayToPlane(Point ptPointOnPlane,
                                                Vector vPlaneNormal,
                                                Point ptPointOnRay,
                                                Vector vRayDirection,
                                                Point &ptIntersectionPoint,
                                                double &dDistToPlaneAlongRay)
{
    Vector vPointOnRayToPointOnPlane = ptPointOnPlane − ptPointOnRay
    dDistToPlaneAlongRay = 0.
    ptIntersectionPoint = {0,0,0}
    double dDotProd1 = DotProduct(vPointOnRayToPointOnPlane, vPlaneNormal)
    double dDotProd2 = DotProduct(vRayDirection, vPlaneNormal)
    if(dDotProd2 == 0)
    {//No intersection is possible, Ray is perpendicular to plane normal. return 0;}
    dDistToPlaneAlongRay= dDotProd1
                          ─────────
                          dDotProd2
    ptIntersectionPoint = ptPointOnRay + dDistToPlaneAlongRay * vRayDirection;
    return SignOf(dDotProd2)
}
```

Assuming the outcome of block 608 is that the current retract direction will advance tool 141 toward the retract plane, controller 202 next performs the functions of block 612. Controller 202 obtains (using Algorithm 610) the signed distance from the current position of tool 141 to the retract plane and to the check plane along the current retract direction. Referring to the example depicted in FIG. 7 wherein tool 141 is located at positive X limit 416 and positive Z limit 412 and the retract direction is along tool vector 428, zero distance can be traveled along the retract vector before encountering a machine limit (i.e., positive Z limit 412). The second step of block 612 indicates that controller 202 clips the retract vector to the machine limits using the Clip Vector Motion ("CVM") Algorithm 614 of FIG. 20, which is described in detail below. At steps 3 and 4, controller 202 identifies which axes were clipped, and the signed length of the clipped retract vector. In the example of FIG. 7, the clipped axis is the z-axis because tool 141 cannot move along tool vector 428 any farther in the z direction of machine tool system 100.

Figure 20:
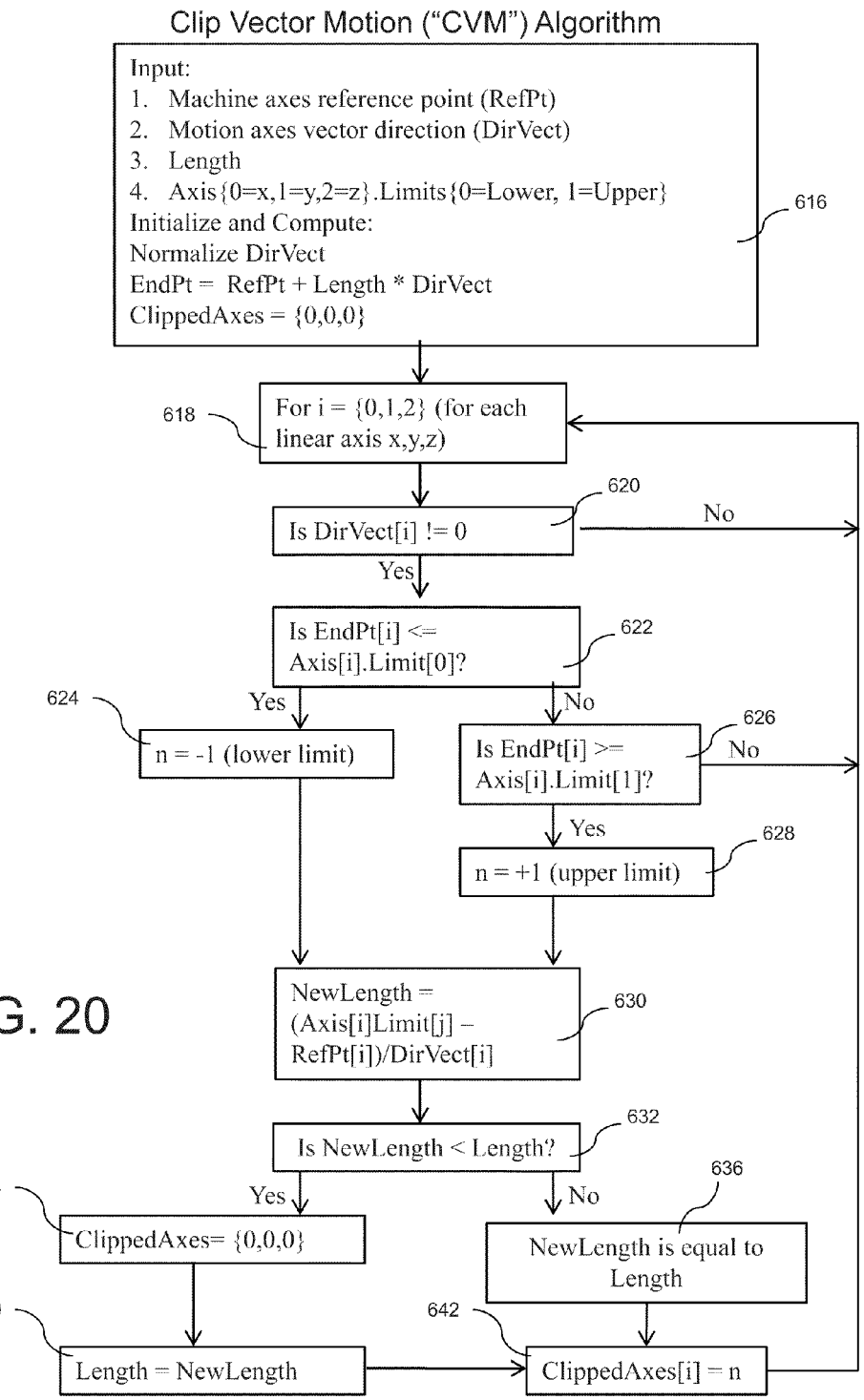
FIG. 20 is a block diagram of a Clip Vector Motion ("CVM") Algorithm according to one embodiment of the present disclosure.

Referring now to FIG. 20, CVM Algorithm 614 includes a variety of input variables as indicated by block 616. The first three variables in block 616 relate to the input ray, which has a start point (RefPt), a direction vector (DirVect), and a length (Length) defined with respect to machine coordinate system 429. Also, DirVect is normalized using Equation 4 described later and the end point for the move (EndPt) is computed with the equation given in block 616. An axis object is inputted in block 616 that, for each axis (x, y, z), there exists an upper and a lower limit. The axis object is indexed to a specific index using 0, 1, 2 corresponding to x, y, z, respectively. The axis limit for each axis of the axis object is indexed using 0 or 1 corresponding to lower and upper limits, respectively. In general, CVM Algorithm 614 clips the length of the ray to the axes limits of machine tool system 100 if the ray extends outside of the limits along the ray direction. CVM Algorithm 614 cycles through each axis limit, clipping the ray if it extends past the limit and storing the shortest clipped length as the final clipped length.

The CVM Algorithm 614 begins in block 618 by incrementing i from 0, 1, 2 corresponding with axes x, y, z with respect to machine coordinate system 429. If the i component of the direction vector (DirVect) is zero, there is no motion in the corresponding axis direction and thus, the algorithm returns directly to block 618 to index to the next axis direction by incrementing i. If the i component of DirVect is not zero in block 620, then the algorithm proceeds to block 622 to compare the i component of EndPt to the lower limit of axis i. If it is less than or equal to the lower limit of axis i, then the ClippedAxis value for axis i is set to −1 to indicate that the axis was clipped to its lower limit, which will be stored in the ClippedAxes vector later in block 642. Proceeding to block 630, the new (clipped) length (NewLength) is computed and in block 632, the NewLength is compared to the current Length. If it is less, then the algorithm proceeds to block 634 where ClippedAxes is reinitialized to zeros for x, y, z, then block 640 updates Length to equal the new clipped length, NewLength. Then in block 642 controller 202 sets the ClippedAxes vector component i to n, which was set in block 624 in this case to −1, indicating that the move was clipped to the lower limit of axis i. CVM Algorithm 614 then returns to block 618 to index to the next axis and repeats itself.

If, however, in block 632 it is found that the new clipped length, NewLength, is not less than the current Length, the algorithm proceeds to block 636 indicating that the NewLength is equal to Length (which will always be the case otherwise the algorithm would have returned directly to block 618 from block 626 because EndPt's i component would have been within machine limits). Then in block 642, controller 202 sets the ClippedAxes vector's i component value to n, which is this case is −1 indicating the move was clipped to the lower limit of axis i. This situation occurs when EndPt is at one or more of the axes limits. An example of this case (exiting block 632 with No) is when the move direction passes through one of the corners where the axes limits intersect (move e in FIG. 21).

If in block 622 the i component of EndPt is greater than axis i's lower limit, CVM Algorithm 614 proceeds to block 626 where it checks if the i component of EndPt is greater than axis i's upper limit. If they are equal, then no clipping will occur and the algorithm returns to block 618 to index to the next axis. If EndPt's i component is greater than or equal to axis i's upper limit, then CVM Algorithm 614 sets the clipped axis value to +1 indicating that the motion was clipped to axis i's upper limit. The algorithm then proceeds as described above from block 630 onward to block 636 or block 642. After having cycled through all three axes x, y, z, CVM Algorithm 614 returns the new clipped length and the vector ClippedAxes, which indicates for each axis whether the move was not clipped to the axis' limit (0), was clipped to the axis' lower limit (−1), or was clipped to the upper limit (+1).

Figure 21:
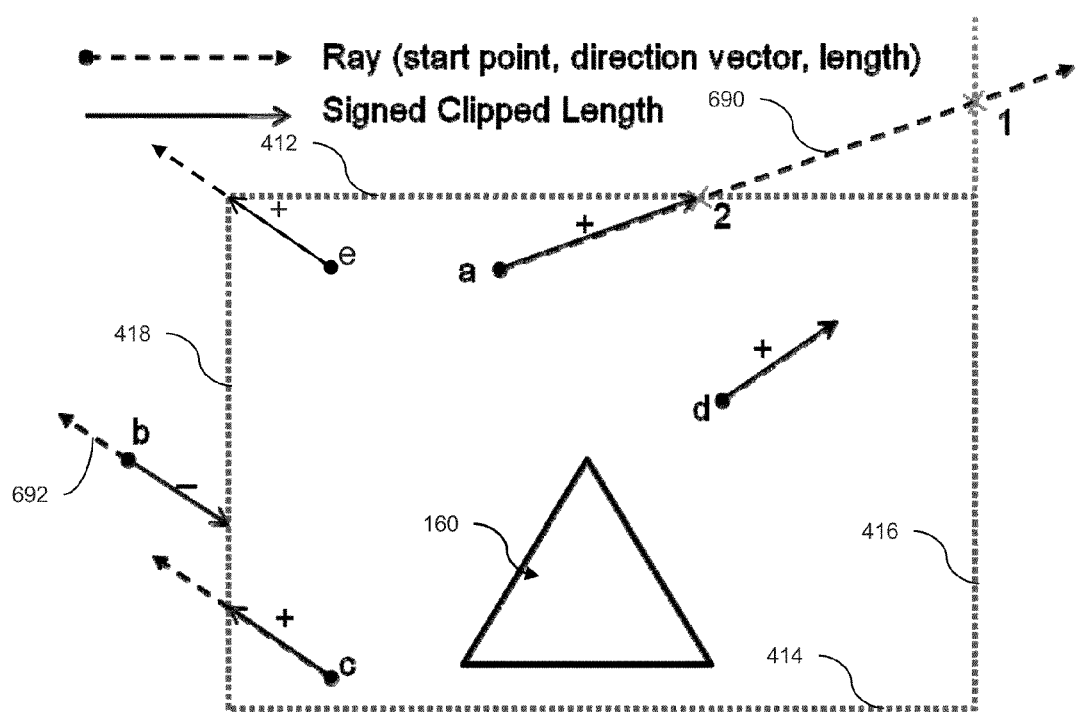
FIG. 21 is a conceptual view illustrating the operation of CVM Algorithm of FIG. 20.

FIG. 21 illustrates an example of the functionality of CVM Algorithm 614. In the example shown, ray 690 is first clipped to positive X limit 416, and then to positive Z limit 412, resulting in the final clipped length. Prior to executing CVM Algorithm 614, controller 202 determines whether the ray start point (RefPt) is within machine limits because CVM Algorithm 614 will clip rays that start out of limits, such as ray 692 (i.e., CVM Algorithm 614 is generic). The return length is signed depending on whether the clipped ray is pointing in the opposite direction to the Ray (b,c). The algorithm also returns a ClippedAxes array which contains a value of {−1, 0,+1} for each axis. The value −1 indicates that the axis motion was clipped to the specified axis' lower limit. The value 0 indicates that the axis motion was not clipped for the axis direction. Finally, the value +1 indicates that the axis motion was clipped to the upper limit for the axis direction. For ray 690 of FIG. 21, the ClippedAxes array is {+1,0,+1}, which indicates that the ray was clipped to the positive X limit 416 and the positive Z limit 412, but not clipped to the Y limits.

Continuing with the example of the retract sequence depicted in FIGS. 7 and 8, at block 650 of FIG. 19 controller 202 determines that the clipped length is greater than or equal to zero (because only a positive portion of the z-component of the retract vector has been clipped). Next controller 202 determines the direction for storing the computed tool positions (i.e., forward order or reverse order) at block 652. Here, as CRS Algorithm 600 is performing a retract sequence, the store position order is forward, and controller 202 pushes (at block 654) the computed position of tool 141 to the back of the move sequence being created by CRS Algorithm 600. Had CRS Algorithm 600 been executing a plunge sequence (i.e., block 562 of FIG. 18), the store position order would have been set to reverse, and controller 202 would have pushed (at block 656) the computed position of tool 141 to the front of the move sequence.

Next (at block 658) controller 202 determines if the clipped length of the retract vector is greater than or equal to the distance to the retract plane, which indicates that the tool is at or above the retract plane. In this example, the clipped length is not greater than or equal to the distance to the retract plane. Thus, controller 202 next (at block 660) determines if the clipped length of the retract vector is greater than or equal to the distance to the check plane, which indicates that the tool is at or above the check plane. If the clipped length is not greater than or equal to the distance to the check plane, controller 202 determines at block 662 whether the variable of allowing moves below the check plane is true. As the variable of allowing moves below the check plane was set to true at block 554 upon initialization of CRS Algorithm 600 for the retract sequence, controller 202 advances from block 662 to block 666.

The variable of allowing moves below the check plane is an option used (i.e., set to true) when computing the retract sequence. If the first retract move does not clear the check plane (because a machine limit is encountered), then that move is allowed and clipping of the retract direction vector for machine limits in the manner described herein and processing the retract moves until a tool position is reached that is at least at or above the check plane is continued. For the plunge sequence described below, the variable of allowing moves below the check plane is set to false, and all computed moves must clear the check plane. For example, if the first move (retract from the target point, which is the position move just before plunging to the target point) does not clear the check plane, an error is generated in the manner described below. In other words, the position of tool 141 just above the target position before plunging to the target position must always be at or above the check plane. Otherwise, it is considered unsafe and the algorithms of the present disclosure generate an error to terminate program execution.

At block 666, controller 202 computes a new retract direction vector by setting the component of the retract vector corresponding to the clipped axis to zero. Controller 202 would also have reached block 666 if the clipped length was greater than or equal to the distance to the check plane (block 660), but only after setting the variable At or Above Check Plane equal to true at block 670. In this instance, the computed move is greater than the distance to the check plane (block 660). Thus, if after further processing all components of the retract vector have been clipped (i.e., no further progress toward the retract plane can be achieved while remaining within the machine limits—the retract vector length is zero), with the At or Above Check Plane flag set to true, CRS Algorithm 600 will still return success (block 678) even though tool 141 did not reach the retract plane. More specifically, after block 666 controller 202 will determine at block 672 that the retract vector is zero and advance to block 674. At block 674 controller checks the status of At or Above Check Plane. If the status is true, Move Sequence is set to complete (block 676), which result in a return of success (blocks 606, 678).

In this example, the new retract vector is no longer the tool vector. The new retract vector (after setting the z-component equal to zero) is in the negative x direction. At block 672, controller 202 calculates the length of the new retract direction vector using Equation 3 and determines if it is non-zero.

Vector $v\{x,y,z\}$ $$\text{Length}(v) = \sqrt{x^2 + y^2 + z^2} \qquad \text{Equation 3:}$$

If the new retract direction vector has zero length, then at block 674, if At or Above Check Plane is true, the move sequence processing is complete and the algorithm returns success at block 678 to block 556 of MTT Algorithm 550 (FIG. 18). Otherwise, the algorithm returns a failure at block 668 to block 556 of MTT Algorithm 550 (FIG. 18) because the tool tip did not reach the check plane.

Returning to block 672 of FIG. 19, when the length of the new retract direction vector is not zero, controller 202 normalizes the retract direction vector at block 680 using Equation 4 and returns to block 606.

$$\text{NormalizeVector}(v) = \left\{ \frac{x}{\text{Length}(v)^r} \quad \frac{y}{\text{Length}(v)^r} \quad \frac{z}{\text{Length}(v)} \right\} \qquad \text{Equation 4:}$$

This would occur when at least one, but not all of the direction components of the retract vector have been clipped, and the retract sequence is not complete. In this example, the z-component of the original retract vector (i.e., tool vector 428) has been clipped, but controller 202 has not yet determined that tool 141 can be safely moved to the retract plane. As the retract sequence is not complete, the determination at block 606 will result in controller 202 using Algorithm 610 (described above) at block 608 to determine if the current retract direction will result in movement of tool 141 from its current position toward the retract plane. Here, movement of tool 141 along positive Z limit 418 in the negative x direction (i.e., the new retract vector) constitutes movement toward retract plane 420. Thus, controller 202 proceeds to block 612.

At block 612, controller 202 uses Algorithm 610 and CVM Algorithm 614 in the manner described above to calculate the signed distance to the retract and check planes along the new retract vector, to clip the retract vector to the extent necessary to avoid exceeding machine limits, and to calculate the length of the clipped retract vector. In this example, tool 141 may be moved to the position of FIG. 8 without exceeding any machine limits. Accordingly, the new retract vector is not clipped and retains a positive length (i.e., the length necessary to reach the retract plane). Thus, at block 650 controller 202 determines that the clipped length of the retract vector is greater than zero, and the corresponding move in the negative X direction along positive Z limit 418 is stored at the end of the move list (see blocks 652 and 654). When controller 202 reaches block 658, it will determine that the clipped length of the retract vector equals the distance to the retract plane. Accordingly, controller 202 sets the Move Sequence Complete variable to true (block 682) and returns to block 606. As the retract sequence is complete, controller 202 returns the retract sequence of moves at block 678 to MTT Algorithm 550 (FIG. 18). At block 556 of MTT Algorithm 550, controller 202 determines that the retract sequence can be performed safely, and advances to block 560 where the retract plane point is defined as the position of tool tip 422 with respect to machine coordinate system 429 at the last move in the retract sequence. As described above, this redefinition of the retract plane point takes care of situations wherein tool 141 is located above the original retract plane or below the original retract plane, but above the check plane. By redefining the retract plane for the plunge sequence, the move from the last position in the retract list to the first position in the plunge sequence list will be parallel to the xy plane of the retract and check planes if no machine limits are encountered in the plunge sequence. In this example, since the last position of tool 141 in the retract sequence is in retract plane 420, the operation at block 560 has no effect.

It should be noted that if, during the retract sequence, controller 202 determines at block 608 that the current retract direction will not move tool 141 toward the retract plane, then controller 202 advances to block 684 to check whether the variable At or Above Check Plane is true. Initially, the variable At or Above Check Plane is set to false (block 602). However, if during the process of clipping axes of the retract direction vector as described above, the clipped length of an axis is zero (block 650), and less than the distance to the retract plane (block 658), but greater than or equal to the distance to the check plane (block 660), the variable At or Above Check Plane is set to true at block 670. In such an example, if the new retract direction vector computed at block 666 has a non-zero length (block 672), it is normalized at block 680 as described above. Then, as the move sequence is not yet complete, controller 202 employs Algorithm 610 (block 608) to determine whether the retract direction will advance tool 141 toward the retract plane. Continuing the example, in situations where the retract direction will not result in motion toward the retract plane (such as the example described below with reference to FIG. 22), controller 202 advances to block 684 and determines that the variable At or Above Check Plane is true. Thus, although tool 141 could not be retracted to above the retract plane, moves have been calculated that at least result in safe positioning of tool 141 above the check plane. A successful retract sequence is indicated at block 678 and returned to block 556 of FIG. 18.

Continuing the example with reference to FIG. 18, after block 560, controller 202 begins the plunge sequence at block 562. As mentioned above, CRS Algorithm 600 described above with reference to the retract sequence is also used for the plunge sequence. The definitions of certain parameters, however, are changed in block 562. More specifically, the start point is set to the target position, the retract direction is set to the inverse of the plunge direction (which may be user-defined or a default of the tool vector when tool 141 is in the target position), the order for storing moves is set to reverse order, and the variable for allowing moves below the check plane is set to false. As described above with reference to FIG. 13, in the plunge sequence, no moves are permitted that result in tool 141 being positioned below the check plane. The first computed move is a move from the target position to a position above the target position. If that first computed move does not position tool 141 in or above the check plane, the plunge sequence fails. These modifications to the input parameters permit use of CRS Algorithm 600 during the plunge sequence without modification to the algorithm. Instead, CRS Algorithm 600 computes the moves needed to retract tool 141 from the target position to the retract plane (or at least the check plane) using the inverse plunge direction and stores those moves in a reverse order. When the moves are executed, the result is a plunge movement of tool 141 from the retract plane (or at least the check plane) to the target position in the plunge direction.

After the plunge parameters are set at block 562 and CRS Algorithm 600 is initiated, controller 202 determines whether the check plane is above the retract plane along the plane normal at block 604 of FIG. 19. Block 604 ensures that the retract plane is always above the check plane along the normal vector of the planes (i.e., the outcome of block 604 must always be no). If not, no moves can be generated (moves to the retract plane will always fail to reach the check plane) and controller 202 will advance to block 668 to return a failure, thereby terminating execution. If the result of block 604 is no, controller 202 then determines at block 606 whether the move sequence (here; the plunge sequence) is complete (i.e., whether the flag has been set to true). Again, initially the result is no. Next, controller 202 determines whether the current retract direction will advance tool 141 toward the retract plane using Algorithm 610 (block 608). Using the example of FIGS. 9 and 10, with the start position as the target position and the retract direction as the inverse plunge direction, the outcome of Algorithm 610 is yes.

Next, at block 612 controller 202 computes the signed distance to the retract and check planes along the retract vector (i.e., the inverse plunge direction). In this example, tool 141 could be moved along the inverse plunge direction from the target position (FIG. 10) to the retract plane (FIG. 9) without encountering a machine limit. Accordingly, the retract vector would not be clipped in block 612. Next, controller 202 computes the signed length of the clipped retract vector according to Algorithm 610. In this example, as the retract vector was not clipped, the length of the retract vector will equal the distance to the retract plane. At block 650, controller 202 determines that the length of the retract vector is greater than zero and advances to block 652. Since the store position order variable was set to reverse in block 562 of FIG. 18, the move from the target point to the retract plane is stored at the front of the move sequence at block 656. Next, at block 658, controller 202 determines that the retract length is equal to the distance to the retract plane. As such, controller 202 sets the move sequence complete variable to true (block 682) and returns to block 606. Since the move sequence is complete, controller 202 returns the move sequence (here, consisting of a single move) and an indication that the plunge sequence was successful to MTT Algorithm 550 (FIG. 18) at block 678.

As indicated above, FIG. 11 depicts a situation where clipping occurs during the plunge sequence. The following is a description of the plunge sequence as executed to reflect the movements depicted in FIG. 11. After initialization at block 562 of FIG. 18 and block 602 of FIG. 19, controller 202 proceeds to block 604 wherein it is determined that check plane 446 is not above retract plane 420 along the normal vector (corresponding to the z axis of second coordinate system 408). As the move sequence is not complete (block 606), controller 202 uses Algorithm 610 to compute whether the current retract direction will advance tool 141 toward retract plane 420. As depicted in FIG. 11, the inverse of vector 442 will advance tool 141 toward retract plane 420. Thus, at block 612 of FIG. 19, controller 202 calculates the distance to retract plane 420 and check plane 446 along the retract direction (using Algorithm 610). Controller 202 also computes (using CVM Algorithm 614) that a machine limit (i.e., negative X limit 418) will be encountered before tool 141 can be moved to the retract plane 420. Accordingly, CVM Algorithm 614 will result in clipping of the negative x-component of the current retract vector. The length of the clipped retract vector will be greater than zero, however, because tool 141 can be moved (in reverse direction when executed) from target position 440 to position 444 (shown in dotted lines in FIG. 11). Consequently, the outcome of block 650 is yes, and the move is stored (block 656) at the front of the move list.

At block 658, controller 202 determines that the clipped retract vector is not greater than or equal to the distance to retract plane 420 (i.e., tool 141 cannot be moved to the retract plane 420 using the current retract vector). At block 660, however, controller 202 determines that the clipped retract vector is at least greater than the distance to check plane 446 (i.e., in FIG. 11, tool 141 in position 444 (dotted lines) is above check plane 446). Thus, at block 670 the variable At or Above Check Plane is set to true. At block 666, controller 202 computes a new retract vector by setting the x-component of the current retract vector equal to zero. Here, the new retract vector is the inverse of vector 448 shown in FIG. 11. Because the new retract vector length is non-zero (block 672), it is normalized using Equation 4 at block 680, and controller 606 determines whether the move sequence is complete at block 606, which it is not. Controller 202 next determines at block 608 that the new retract vector will advance tool 141 toward retract plane 420. Controller 202 then determines (block 612) the distance to retract plane 420 along the current retract vector and whether further clipping is necessary. As shown in FIG. 11, tool 141 can be moved from position 444 to position 450 without encountering a machine limit. Accordingly, at block 650 controller 202 determines that the clipped length of the current retract vector (which was not clipped) is non-zero, and the move is pushed to the front of the move list at block 656. At block 658, controller 202 determines that the clipped length of the retract vector is equal to the distance to retract plane 420, and sets the move sequence complete variable to true at block 682. After block 606, the calculation of a successful plunge sequence is returned (block 678) to MTT Algorithm 550 (block 564), and the moves are executed in the manner described above.

Figure 22:
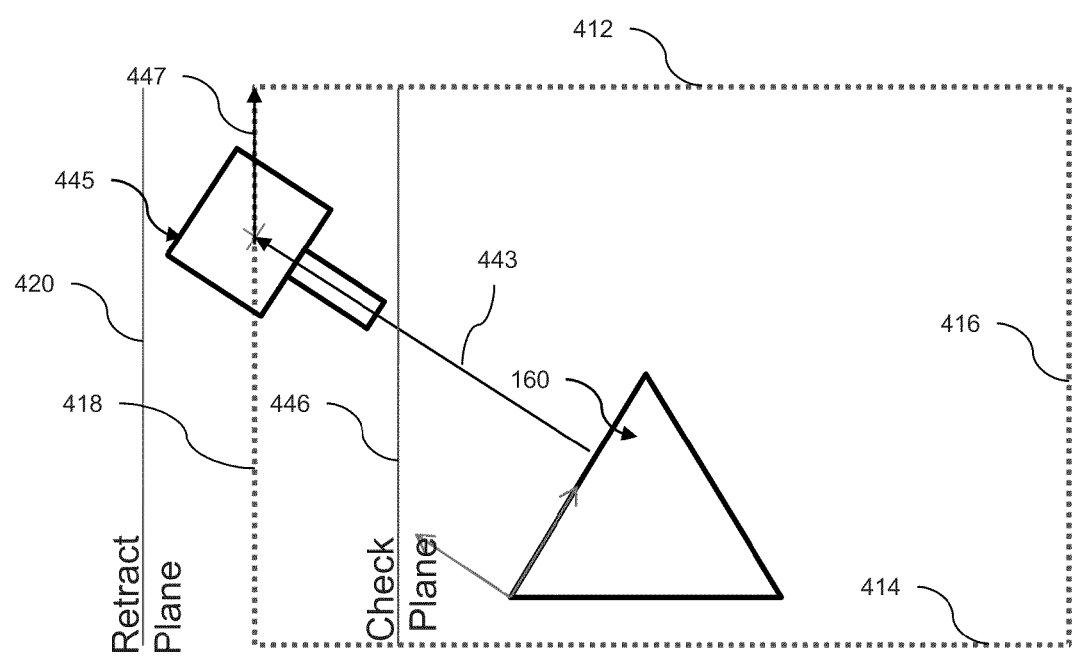
FIG. 22 is a conceptual view illustrating various positions of a tool during a plunge sequence.

FIG. 22 depicts an example of a successful plunge sequence wherein tool 141 controller 202 determines that, after clipping, the new retract vector will not advance tool 141 toward retract plane 420, but still returns success at block 678 of FIG. 19 because tool 141 can be moved to at or above check plane 446. More specifically, after determining at block 604 that check plane 446 is not above retract plane 420 along the plane normal, and that the plunge sequence is not complete (block 606), controller 202 determines whether the current retract direction will advance tool 141 toward retract plane 420. Initially, when tool 141 is in the target position (not shown in FIG. 22), the outcome of block 608 is yes (i.e., the direction of inverse plunge vector 443 will advance tool 141 toward retract plane 420). Thus, controller 202 executes the steps of CRS Algorithm 600 described above to clip vector 443 to the length shown in FIG. 22, and to compute a new motion vector 447. After controller 202 returns to block 606 and determines that the move sequence is not complete, controller 202 determines using Algorithm 610 (described above) that motion vector 447 will not move tool 141 toward retract plane 420. As motion vector 447 has only a z-component, which in this example is parallel to retract plane 420, movement along motion vector 447 is not necessary. Thus, controller advances to block 684 where it is determined that tool 141 (in position 445) is at or above check plane 446. Consequently, controller 202 returns a successful plunge sequence (block 678) to MTT Algorithm 550 of FIG. 18.

Referring now to FIG. 13, the following is a description of an unsuccessful plunge sequence. In this example, after initialization (block 562 of FIG. 18 and block 602 of FIG. 19), determining that check plane 460 is not above retract plane 462 (block 606), and determining that the move sequence is not complete (block 606), controller 202 uses Algorithm 610 (block 608) to determine whether the current retract vector (the inverse of vector 464) will advance tool 141 toward retract plane 462. Because the retract vector will advance tool 141 toward retract plane 462, controller 202 advances to block 612 to determine the distance to retract plane 462 and check plane 460, and (using CVM Algorithm 614 of FIG. 20) whether machine limits will be encountered upon moving tool 141 to retract plane 462. As shown in FIG. 13, negative X limit 418 is encountered. As such, the current retract vector is clipped to the length shown in FIG. 13. Because the clipped length is non-zero, the move depicted in FIG. 13 is stored at the front of the move list (blocks 650, 652 and 656 of FIG. 19). When controller 202 reaches block 658, it determines that the clipped length of the retract vector is not greater than or equal to the distance to retract plane 462. At block 660, controller 202 also determines that the clipped length is not greater than or equal to the distance to check plane 460. As the variable for allowing moves below the check plane was set to false at initialization of the plunge sequence (block 562 of FIG. 18), the outcome of block 662 is no, and controller 202 reports an unsuccessful plunge sequence (block 668) that generates an error (blocks 564 and 558 of FIG. 18) and terminates program execution.

Returning to the example of FIGS. 9 and 10, after the successful plunge sequence is computed, at block 566 of FIG. 18, controller 202 executes the retract and plunge sequences of moves, and returns to block 524 of FIG. 16. As explained above, controller 202 reached block 524 after encountering a G08.2 Buffer Off command 500 in part program 204 with the variable Buffer State 506 set to On (which occurred at block 516 when a G08.1 Buffer On command 492 was encountered during processing of PCP Algorithm 502). Upon reaching block 524, controller 202 set Buffer State 506 to Off, Notify Out Of Limits 508 to On, and began executing ASR Algorithm 540 of FIG. 17. In the process, controller 202 performed a reorientation of tool 141 as described with reference to FIG. 17, followed by execution of MTT Algorithm 550 of FIG. 18. Execution of MTT Algorithm 550 of FIG. 18 involved execution of CRS Algorithm 600 of FIG. 19 (along with CVM Algorithm 614 of FIG. 20) twice, once for the retract sequence and once for the plunge sequence. Upon returning to block 524 of PCP Algorithm 502 (FIG. 16), controller 202 reaches block 526 wherein controller 202 continues normal processing of commands (i.e., with Buffer State set to Off, motion commands are outputted to machine tool system 100 at block 532). This completes the automatic safe repositioning of tool 141.

Having described the operation of the various algorithms for automatic safe repositioning, the following is a more detailed description of part program 204 and the manner in which blocks of commands are buffered for processing according to the principles of the present disclosure. Returning back to part program 204 of FIG. 15 and cube 479 of FIG. 15A, when controller 202 processes the G08.1 Buffer On command 492, the variable Program Command equals Buffer On (block 512 of PCP Algorithm 502 of FIG. 16), which causes controller 202 to begin buffering commands in the manner discussed above with respect to FIG. 16. The command on line N2 of FIG. 15 is a Group 2 (specifying a tool 141) which is pushed to the event buffer at block 522 of PCP Algorithm 502. Next, at line N3 controller 202 encounters Group 3 commands that define the coordinate system of the transform plane associated with the cutting of square 477 of cube 479 relative to coordinate system 481 of FIG. 15A. These commands are internally executed at block 526 of PCP Algorithm 502. Controller 202 next buffers the Group 1 commands at line N4 which simply specify the speed of spindle 138, its direction of rotation, and activation of the coolant system. Line N5 includes Group 3 commands for defining the location and orientation of the tip of tool 141 in the transform plane defined in line N3 in preparation for cutting square 477. The first G08.2 Buffer Off command 500 is encountered at line N6, which causes the variable Program Command to transition to Buffer Off. As shown at block 514 of PCP Algorithm 502, when Program Command equals Buffer Off and Buffer State equals On (which it does at this stage of execution of part program 204), controller 202 proceeds to block 524 to begin execution of ASR Algorithm 540 and the other associated algorithms for computing safe repositioning of tool 141 from its position just prior to the G08.1 Buffer On command 492 to the position specified in line N5.

As described above with reference to block 542 of ASR Algorithm 540, a variety of parameters are used in the process of defining repositioning sequences. The G08.2 Buffer Off command 500 may be used to specify some or all of these parameters as selected by the programmer. For example, a G08.2 Buffer Off command 500 followed by no parameter specifications causes controller 202 to use default values for those parameters. More specifically, the retract direction default is along the target position's tool vector in the current coordinate system {0,0,1}. The plunge direction default is the inverse of the target position's tool vector {0,0,−1}. The plane normal default is along the inverse of the plunge direction vector {0,0,1}. The default distance of the retract plane from that target point ("L") along the retract direction is infinity. This causes controller 202 to clip movement of tool 141 to machine limits when computing the retract sequence. Finally, the default distance of the check plane from the target point ("Q") along the inverse plunge direction is zero, which indicates that the check plane passes through the target point {0,0,5}.

An example of a higher level of specificity for G08.2 Buffer Off command 500 is the command "G08.2 L95 Q45" shown at line N18 of part program 204 (and discussed below). Controller 202 will use default values for the retract direction, the plunge direction and the plane normal as described above. However, the retract plane location and the check plane location have been specified, so default values will not be used. More specifically, the parameter "L95" indicates to controller 202 that the incremental distance from the target point {0,0,5} along the plane normal {0,0,1} through which the retract plane passes is 95 mm and thus, passes through the point {0.0.100} with respect to the transform plane specified at line N15 of part program 204. Similarly, the parameter "Q45" indicates to controller 202 that the incremental distance from the target point {0,0,5} along the plane normal {0,0,1} through which the check plane passes is 45 mm and thus, passes through point {0,0,50} with respect to the transform plane specified at lint N15 of part program 204. Since parameter R1 is not included with G08.2 Buffer Off command 500 at line N18 of part program 204, controller 202 uses the default plane normal direction, which is the inverse of the plunge direction vector (here, {0,0,1}).

At line N6 of part program 204, a fully defined G08.2 Buffer Off command 500 is used. For the command at line N6, the parameter "A0.B0.C1" specifies the retract direction vector with respect to the current coordinate system, which in this example is the transform plane specified at line N3 in part program 204. The parameter "U0.V0.W-1" specifies the plunge direction vector with respect to the current coordinate system. The parameter "R1" specifies the plane normal vector as being along the z-direction of the current coordinate system. The retract plane is specified by defining a point ("X0.Y0.Z100") lying in the retract plane with respect to the current coordinate system (in this example, the transform plane specified in line N3). Similarly, rather than specifying the check plane with an incremental distance from the target point as explained above, the check plane in this example is defined by a point ("I0.J0.K50") lying in the check plane with respect to the current coordinate system.

After repositioning tool 141, controller 202 resumes execution of part program 204 by executing the commands at lines N7-N12, which causes tool 141 to cut square 477 in cube 479, deactivate spindle 138, and turn off the coolant system. At line N13, controller encounters a G69 command, which cancels the current transform plane. Controller 202 again encounters a G08.1 Buffer On command 492 at line N14 of part program 204. With Buffer State 506 having been set to Off at block 524 of PCP Algorithm 502 and Program Command equal to On, controller 202 again begins the process of buffering Group 1 and Group 2 commands and executing Group 3 commands until another G08.2 Buffer Off command 500 is encountered. At line N15 another set of Group 3 commands defines a new transform plane coordinate system used to control movement of tool 141 during the cutting of square 475. Like the Group 3 commands at line N5, the commands at line N16 specify the location and orientation of tool 141 in the new transform plane. The commands at line N17 are Group 1 commands that specify the direction of spindle 138 and activate the coolant system. At line N18, controller encounters another G08.2 Buffer Off command 500, which specifies the retract plane and check plane using incremental distances from the target point as described above. This again causes controller 202 to execute the ASR Algorithm 540 to reposition tool 141 from its last position after cutting square 477 of cube 479 (FIG. 15A) to the beginning position for cutting square 475.

After the safe repositioning of tool 141, controller 202 executes the commands at lines N19-N28 which cause the cutting of square 475, turn off spindle 138 and the coolant system, retract tool 141 to machine limits, reset the transform plane, and end part program 204.

As may be apparent to one skilled in the art, in the example above neither the retract sequence nor the plunge sequence generated a computation of a move of tool 141 from the position shown in FIG. 8 to position 432 of FIG. 9 within the retract plane. This move is simply a transition move from the last position of the retract sequence of moves (i.e., FIG. 8) to the first position of the plunge sequence (i.e., FIG. 9). In other words, as machine tool system 100 executes the moves generated by algorithm 550 of FIG. 18 (i.e., intermediate moves between the position of tool 141 just before a G08.1 Buffer On command 492 and the position of tool 141 after a G08.2 Buffer Off command 500), tool 141 is moved from one intermediate position to the next. This includes the move from the last position of the retract sequence to the first position of the plunge sequence.

While the present disclosure has focused on use of the automatic safe repositioning concepts to safely reposition a tool during normal execution of a part program, other uses exist. For example, the concepts apply as well to enhance the recovery restart functions of a machine tool system. In certain cases, it is desirable to begin execution of a part program at a recovery block of commands other than the first block of commands (e.g., at block 2000 of a total of 10,000 blocks of commands). Instead of simply moving the tool to the first location specified in the recovery block and executing the part program from there, the concepts described above permit the user to insert a Buffer On command at the beginning of the part program and a Buffer Off command at the recovery block. The controller then internally processes all of the intervening commands and machine states and outputs only those commands that are necessary for proper operation of the part program from the recovery block forward. In another embodiment, controller 202 automatically internally inserts a G08.1 Buffer On command before the first program block and a G08.2 just prior to the recovery restart block, thereby automatically invoking the ASR Command Buffering algorithms.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A method for automatically repositioning a tool within the three-dimensional working space of a machine tool system from a current position to a target position, the method including the steps of:
   (A) computing at least one retract move of the tool, based on a retract vector, from the current position to a retracted position in a retract plane by adjusting the retract vector, as necessary, such that the retract vector corresponds to movement of the tool toward the retract plane while remaining within the working space of the machine tool system;
   (B) computing at least one plunge move of the tool, based on a motion vector that is an inverse of a plunge vector, from the target position to a plunge position in the retract plane by adjusting the motion vector, as necessary, such that the motion vector corresponds to movement of the tool toward the retract plane while remaining within the working space of the machine tool system; and
   (C) moving the tool from the current position, to the retracted position and from the plunge position to the target position, wherein the retract plane defines a desired safe distance of the tool from a part prior to moving the tool from the plunge position to the target position.

2. The method of claim 1, wherein the machine tool system includes a five-axis machine tool.

3. The method of claim 1, wherein the retract plane is parallel to an xy plane of a coordinate system corresponding to the target position.

4. The method of claim 1, wherein the step of computing at least one retract move further includes the step of determining whether movement along the retract vector will result in repositioning the tool in a retracted position in or above a check plane when movement along the retract vector will not result in repositioning of the tool in the retracted position in the retract plane while remaining within the working space of the machine tool system.

5. The method of claim 4, wherein the step of computing at least one plunge move further includes the step of determining whether movement along the motion vector will result in repositioning the tool in a plunge position in a check plane when movement along the motion vector will not result in repositioning of the tool in the plunge position in the retract plane while remaining within the working space of the machine tool system.

6. The method of claim 4, wherein the check plane defines a secondary desired safe distance of the tool from the part prior to moving the tool from the plunge position to the target position.

7. The method of claim 4, wherein, unless specified otherwise by a user of the machine tool system, the check plane corresponds to a plane occupied by a tip of the tool when the tool is in the target position.

8. The method of claim 5, wherein the step of computing at least one plunge move further includes the step of generating an error message if movement along the motion vector will not result in repositioning of the tool in a plunge position in or above the check plane.

9. The method of claim 4, wherein the step of computing at least one retract move includes the step of computing a check plane point as being the difference between a target point corresponding to the target position and the product of a direction of the inverse of the plunge vector and a check plane distance from the target position.

10. The method of claim 1, further including the step of repositioning the tool from a start position to the current position.

11. The method of claim 1, wherein the computing steps use a common algorithm for adjusting the retract vector and adjusting the motion vector.

12. The method of claim 1, wherein the step of computing at least one retract move includes the step of determining whether the retract vector is valid for moving the tool into the retracted position.

13. A method for automatically repositioning a tool within the three-dimensional working space of a machine tool system from a current position to a target position, the method including the steps of:
   (A) computing at least one retract move of the tool, based on a retract vector, from the current position to a retracted position in a retract plane by adjusting the retract vector, as necessary, such that the retract vector corresponds to movement of the tool toward the retract plane while remaining within the working space of the machine tool system;
   (B) computing at least one plunge move of the tool, based on a motion vector that is an inverse of a plunge vector, from the target position to a plunge position in the retract plane by adjusting the motion vector, as necessary, such that the motion vector corresponds to movement of the tool toward the retract plane while remaining within the working space of the machine tool system; and
   (C) moving the tool from the current position, to the retracted position and from the plunge position to the target position, wherein a default vector for both the retract vector and the plunge vector corresponds to a tool vector that extends longitudinally from a tip of the tool along a center of rotation of the tool.

14. The method of claim 13, wherein the default vector for the plunge vector is the tool vector when the tool is in the target position.

15. A method for automatically repositioning a tool within the three-dimensional working space of a machine tool system from a current position to a target position, the method including the steps of:
- (A) computing at least one retract move of the tool, based on a retract vector, from the current position to a retracted position in a retract plane by adjusting the retract vector, as necessary, such that the retract vector corresponds to movement of the tool toward the retract plane while remaining within the working space of the machine tool system;
- (B) computing at least one plunge move of the tool, based on a motion vector that is an inverse of a plunge vector, from the target position to a plunge position in the retract plane by adjusting the motion vector, as necessary, such that the motion vector corresponds to movement of the tool toward the retract plane while remaining within the working space of the machine tool system; and
- (C) moving the tool from the current position, to the retracted position and from the plunge position to the target position, wherein the plunge vector is specified relative to a coordinate system corresponding to the target position in a buffer off command in a part program executed by the machine tool system.

16. A method for automatically repositioning a tool within the three-dimensional working space of a machine tool system from a current position to a target position, the method including the steps of:
- (A) computing at least one retract move of the tool, based on a retract vector, from the current position to a retracted position in a retract plane by adjusting the retract vector, as necessary, such that the retract vector corresponds to movement of the tool toward the retract plane while remaining within the working space of the machine tool system;
- (B) computing at least one plunge move of the tool, based on a motion vector that is an inverse of a plunge vector, from the target position to a plunge position in the retract plane by adjusting the motion vector, as necessary, such that the motion vector corresponds to movement of the tool toward the retract plane while remaining within the working space of the machine tool system; and
- (C) moving the tool from the current position, to the retracted position and from the plunge position to the target position further including the step of repositioning the tool from a start position to the current position, wherein the step of repositioning the tool includes the step of computing an initial sequence of moves to reorient the tool at the current position with maximum clearance between the tool and a part.

17. The method of claim 16, wherein the step of computing an initial sequence of moves includes the step of computing a move of the tool along a tool vector to a machine limit defining, in one direction, an outer boundary of the three-dimensional working space.

18. The method of claim 17, wherein the step of computing an initial sequence of moves further includes the step of computing a move of the tool along the machine limit to a second machine limit.

19. A method for automatically repositioning a tool within the three-dimensional working space of a machine tool system from a current position to a target position, the method including the steps of:
- (A) computing at least one retract move of the tool, based on a retract vector, from the current position to a retracted position in a retract plane by adjusting the retract vector, as necessary, such that the retract vector corresponds to movement of the tool toward the retract plane while remaining within the working space of the machine tool system;
- (B) computing at least one plunge move of the tool, based on a motion vector that is an inverse of a plunge vector, from the target position to a plunge position in the retract plane by adjusting the motion vector, as necessary, such that the motion vector corresponds to movement of the tool toward the retract plane while remaining within the working space of the machine tool system; and
- (C) moving the tool from the current position, to the retracted position and from the plunge position to the target position further including the step of repositioning the tool from a start position to the current position, wherein the step of repositioning the tool includes the steps of computing a first orientation of the tool corresponding to the start position in a coordinate system corresponding to the target position, computing a second orientation of the tool corresponding to the current position in the coordinate system, and reorienting the tool from the first orientation to the second orientation.

20. A method for automatically repositioning a tool within the three-dimensional working space of a machine tool system from a current position to a target position, the method including the steps of:
- (A) computing at least one retract move of the tool, based on a retract vector, from the current position to a retracted position in a retract plane by adjusting the retract vector, as necessary, such that the retract vector corresponds to movement of the tool toward the retract plane while remaining within the working space of the machine tool system;
- (B) computing at least one plunge move of the tool, based on a motion vector that is an inverse of a plunge vector, from the target position to a plunge position in the retract plane by adjusting the motion vector, as necessary, such that the motion vector corresponds to movement of the tool toward the retract plane while remaining within the working space of the machine tool system; and
- (C) moving the tool from the current position, to the retracted position and from the plunge position to the target position, wherein the computing steps use a common algorithm for adjusting the retract vector and adjusting the motion vector and, wherein during the step of computing at least one plunge move, inputs to the common algorithm include the target position as a start position, a reverse order for storing the at least one plunge move, and an indication that moves below a check plane are prohibited.

21. A method for automatically repositioning a tool within the three-dimensional working space of a machine tool system from a current position to a target position, the method including the steps of:
- (A) computing at least one retract move of the tool, based on a retract vector, from the current position to a retracted position in a retract plane by adjusting the retract vector, as necessary, such that the retract vector corresponds to movement of the tool toward the retract plane while remaining within the working space of the machine tool system;
- (B) computing at least one plunge move of the tool, based on a motion vector that is an inverse of a plunge vector, from the target position to a plunge position in the retract plane by adjusting the motion vector, as necessary, such that the motion vector corresponds to movement of the tool toward the retract plane while remaining within the working space of the machine tool system; and (C) moving the tool from the current position, to the retracted position and from the plunge position to the target position, wherein the retract vector is specified relative to a first coordinate system in a buffer off command in a part program executed by the machine tool system, the first coordinate system being different from a second coordinate system corresponding to the target position.

22. A method for automatically repositioning a tool within the three-dimensional working space of a machine tool system from a current position to a target position, the method including the steps of:

(A) computing at least one retract move of the tool, based on a retract vector, from the current position to a retracted position in a retract plane by adjusting the retract vector, as necessary, such that the retract vector corresponds to movement of the tool toward the retract plane while remaining within the working space of the machine tool system;

(3) computing at least one plunge move of the tool, based on a motion vector that is an inverse of a plunge vector, from the target position to a plunge position in the retract plane by adjusting the motion vector, as necessary, such that the motion vector corresponds to movement of the tool toward the retract plane while remaining within the working space of the machine tool system; and (C) moving the tool from the current position, to the retracted position and from the plunge position to the target position, wherein the step of computing at least one retract move includes the step of determining whether the retract vector is valid for moving the tool into the retracted position and, wherein the determining step includes the steps of mathematically projecting the retract vector onto a normal vector and determining whether the projection is positive.

23. A method for automatically repositioning a tool within the three-dimensional working space of a machine tool system from a current position to a target position, the method including the steps of:

(A) computing at least one retract move of the tool, based on a retract vector, from the current position to a retracted position in a retract plane by adjusting the retract vector, as necessary, such that the retract vector corresponds to movement of the tool toward the retract plane while remaining within the working space of the machine tool system;

(B) computing at least one plunge move of the tool, based on a motion vector that is an inverse of a plunge vector, from the target position to a plunge position in the retract plane by adjusting the motion vector, as necessary, such that the motion vector corresponds to movement of the tool toward the retract plane while remaining within the working space of the machine tool system; and (C) moving the tool from the current position, to the retracted position and from the plunge position to the target position, wherein the at least one retract move and the at least one plunge move are stored in a buffer until it is determined that the tool can be safely moved from the current position to the target position, the moving step including the step of executing the stored at least one retract move and the stored at least one plunge move.

24. A method for automatically repositioning a tool within the three-dimensional working space of a machine tool system from a current position to a target position, the method including the steps of:

(A) computing at least one retract move of the tool, based on a retract vector, from the current position to a retracted position in a retract plane by adjusting the retract vector, as necessary, such that the retract vector corresponds to movement of the tool toward the retract plane while remaining within the working space of the machine tool system;

(B) computing at least one plunge move of the tool, based on a motion vector that is an inverse of a plunge vector, from the target position to a plunge position in the retract plane by adjusting the motion vector, as necessary, such that the motion vector corresponds to movement of the tool toward the retract plane while remaining within the working space of the machine tool system; and (C) moving the tool from the current position, to the retracted position and from the plunge position to the target position, wherein the step of computing at least one retract move includes the step of computing a retract plane point as being the sum of a target point corresponding to the target position and the product of a direction of the retract vector and a retract plane distance from the target position.

25. An apparatus for machining a part with at least one tool, the apparatus comprising:

a frame;

a moveable support supported by and moveable relative to the frame, the moveable support supporting the part;

a machine tool spindle supported by the frame and moveable relative to the part, the machine tool spindle adapted to couple to the at least one tool, the moveable support and the machine tool spindle being movable by a drive system within a three-dimensional working space defined by a plurality of axis limits; and a motion control system operably coupled to the machine tool spindle and the moveable support, the motion control system including a controller that controls movement of the machine tool spindle and the moveable support to automatically reposition the tool from a first position to a second position, both positions being specified by a part program independently of the plurality of axis limits;

wherein the controller repositions the tool by computing at least one retract move of the tool, based on a retract vector, from the first position to a retracted position in a retract plane by adjusting the retract vector, as necessary, such that the retract vector corresponds to movement of the tool toward the retract plane while remaining within the three-dimensional working space;

computing at least one plunge move of the tool, based on a motion vector that is an inverse of a plunge vector, from the second position to a plunge position in the retract plane by adjusting the motion vector, as necessary, such that the motion vector corresponds to movement of the tool toward the retract plane while remaining within the three-dimensional working space; and outputting motion commands to the drive system, thereby moving the tool from the first position, to the retracted position and from the plunge position to the second position, wherein the retract plane defines a desired safe distance of the tool from the part prior to moving the tool from the plunge position to the second position.

26. The apparatus of claim 25, wherein the retract plane is parallel to an xy plane of a coordinate system corresponding to the target position.

27. The apparatus of claim 25, wherein the controller further determines whether movement along the retract vector will result in repositioning the tool in a retracted position in a check plane when movement along the retract vector will not result in repositioning the tool in the retracted position in the retract plane while remaining within the three-dimensional working space.

28. The apparatus of claim 27, wherein the controller further determines whether movement along the motion vector will result in repositioning the tool in a plunge position in a check plane when movement along the motion vector will not result in repositioning the tool in the plunge position in the retract plane while remaining within the three-dimensional working space.

29. The apparatus of claim 27, wherein the check plane defines a secondary desired safe distance of the tool from the part prior to moving the tool from the plunge position to the second position.

30. The apparatus of claim 27, wherein a default definition of the check plane is a plane occupied by a tip of the tool when the tool is in the second position.

31. The apparatus of claim 25, wherein the controller further repositions the tool from a start position to the first position.

32. An apparatus for machining a part with at least one tool, the apparatus comprising:
   a frame;
   a moveable support supported by and moveable relative to the frame, the moveable support supporting the part;
   a machine tool spindle supported by the frame and moveable relative to the part, the machine tool spindle adapted to couple to the at least one tool, the moveable support and the machine tool spindle being movable by a drive system within a three-dimensional working space defined by a plurality of axis limits; and
   a motion control system operably coupled to the machine tool spindle and the moveable support, the motion control system including a controller that controls movement of the machine tool spindle and the moveable support to automatically reposition the tool from a first position to a second position, both positions being specified by a part program independently of the plurality of axis limits;
   wherein the controller repositions the tool by
   computing at least one retract move of the tool, based on a retract vector, from the first position to a retracted position in a retract plane by adjusting the retract vector, as necessary such that the retract vector corresponds to movement of the tool toward the retract plane while remaining within the three-dimensional working space;
   computing at least one plunge move of the tool, based on a motion vector that is an inverse of a plunge vector, from the second position to a plunge position in the retract plane by adjusting the motion vector, as necessary, such that the motion vector corresponds to movement of the tool toward the retract plane while remaining within the three-dimensional working space; and
   outputting motion commands to the drive system, thereby moving the tool from the first position, to the retracted position and from the plunge position to the second position, wherein a default vector for both the retract vector and the inverse of the plunge vector corresponds to a tool vector that extends longitudinally from a tip of the tool toward the machine tool spindle along a center of rotation of the tool.

33. The apparatus of claim 32, wherein the controller is configured to automatically reposition the tool when the tool vector, the retract vector, the plunge vector, and a plane normal direction are all different from one another.

34. An apparatus for machining a part with at least one tool, the apparatus comprising:
   a frame;
   a moveable support supported by and moveable relative to the frame, the moveable support supporting the part;
   a machine tool spindle supported by the frame and moveable relative to the part, the machine tool spindle adapted to couple to the at least one tool, the moveable support and the machine tool spindle being movable by a drive system within a three-dimensional working space defined by a plurality of axis limits; and
   a motion control system operably coupled to the machine tool spindle and the moveable support, the motion control system including a controller that controls movement of the machine tool spindle and the moveable support to automatically reposition the tool from a first position to a second position, both positions being specified by a part program independently of the plurality of axis limits;
   wherein the controller repositions the tool by
   computing at least one retract move of the tool, based on a retract vector, from the first position to a retracted position in a retract plane by adjusting the retract vector, as necessary, such that the retract vector corresponds to movement of the tool toward the retract plane while remaining within the three-dimensional working space;
   computing at least one plunge move of the tool, based on a motion vector that is an inverse of a plunge vector, from the second position to a plunge position in the retract plane by adjusting the motion vector, as necessary, such that the motion vector corresponds to movement of the tool toward the retract plane while remaining within the three-dimensional working space; and
   outputting motion commands to the drive system, thereby moving the tool from the first position, to the retracted position and from the plunge position to the second position, wherein the controller further repositions the tool from a start position to the first position and, wherein the controller further computes an initial sequence of moves to reorient the tool at the first position with maximum clearance between the tool and the part.

35. The apparatus of claim 34, wherein the initial sequence of moves includes a move of the tool along a tool vector to an axis limit, and a move of the tool along the axis limit to a second axis limit.

36. An apparatus for machining a part with at least one tool, the apparatus comprising:
   a frame;
   a moveable support supported by and moveable relative to the frame, the moveable support supporting the part;
   a machine tool spindle supported by the frame and moveable relative to the part, the machine tool spindle adapted to couple to the at least one tool, the moveable support and the machine tool spindle being movable by a drive system within a three-dimensional working space defined by a plurality of axis limits; and
   a motion control system operably coupled to the machine tool spindle and the moveable support, the motion control system including a controller that controls movement of the machine tool spindle and the moveable support to automatically reposition the tool from a first position to a second position, both positions being specified by a part program independently of the plurality of axis limits;
wherein the controller repositions the tool by
computing at least one retract move of the tool, based on a retract vector, from the first position to a retracted position in a retract plane by adjusting the retract vector, as necessary such that the retract vector corresponds to movement of the tool toward the retract plane while remaining within the three-dimensional working space;
computing at least one plunge move of the tool, based on a motion vector that is an inverse of a plunge vector, from the second position to a plunge position in the retract plane by adjusting the motion vector, as necessary, such that the motion vector corresponds to movement of the tool toward the retract plane while remaining within the three-dimensional working space; and
outputting motion commands to the drive system, thereby moving the tool from the first position, to the retracted position and from the plunge position to the second position, wherein the controller further repositions the tool from a start position to the first position and, wherein the controller further computes a first orientation of the tool corresponding to the start position in a coordinate system corresponding to the second position, computes a second orientation of the tool corresponding to the first position in the coordinate system, and reorients the tool from the first orientation to the second orientation.

37. An apparatus for machining a part with at least one tool, the apparatus comprising:
a frame;
a moveable support supported by and moveable relative to the frame, the moveable support supporting the part;
a machine tool spindle supported by the frame and moveable relative to the part, the machine tool spindle adapted to couple to the at least one tool, the moveable support and the machine tool spindle being movable by a drive system within a three-dimensional working space defined by a plurality of axis limits; and
a motion control system operably coupled to the machine tool spindle and the moveable support, the motion control system including a controller that controls movement of the machine tool spindle and the moveable support to automatically reposition the tool from a first position to a second position, both positions being specified by a part program independently of the plurality of axis limits;
wherein the controller repositions the tool by
computing at least one retract move of the tool, based on a retract vector, from the first position to a retracted position in a retract plane by adjusting the retract vector, as necessary, such that the retract vector corresponds to movement of the tool toward the retract plane while remaining within the three-dimensional working space;
computing at least one plunge move of the tool, based on a motion vector that is an inverse of a plunge vector, from the second position to a plunge position in the retract plane by adjusting the motion vector, as necessary, such that the motion vector corresponds to movement of the tool toward the retract plane while remaining within the three-dimensional working space; and
outputting motion commands to the drive system, thereby moving the tool from the first position, to the retracted position and from the plunge position to the second position, wherein the controller further determines whether the retract vector is valid for moving the tool into the retracted position before computing the at least one retract move.

38. The apparatus of claim 37, wherein the controller determines that the retract vector is valid if a mathematical projection of the retract vector onto a normal vector is positive.

39. An apparatus for machining a part with at least one tool, the apparatus comprising:
a frame;
a moveable support supported by and moveable relative to the frame, the moveable support supporting the part;
a machine tool spindle supported by the frame and moveable relative to the part, the machine tool spindle adapted to couple to the at least one tool, the moveable support and the machine tool spindle being movable by a drive system within a three-dimensional working space defined by a plurality of axis limits; and
a motion control system operably coupled to the machine tool spindle and the moveable support, the motion control system including a controller that controls movement of the machine tool spindle and the moveable support to automatically reposition the tool from a first position to a second position, both positions being specified by a part program independently of the plurality of axis limits;
wherein the controller repositions the tool by
computing at least one retract move of the tool, based on a retract vector, from the first position to a retracted position in a retract plane by adjusting the retract vector, as necessary, such that the retract vector corresponds to movement of the tool toward the retract plane while remaining within the three-dimensional working space;
computing at least one plunge move of the tool, based on a motion vector that is an inverse of a plunge vector, from the second position to a plunge position in the retract plane by adjusting the motion vector, as necessary, such that the motion vector corresponds to movement of the tool toward the retract plane while remaining within the three-dimensional working space; and
outputting motion commands to the drive system, thereby moving the tool from the first position, to the retracted position and from the plunge position to the second position, wherein the controller stores the at least one retract move and the at least one plunge move in a buffer until the controller determines that the tool can be safely moved from the first position to the second position.

40. An apparatus for machining a part with at least one tool, the apparatus comprising:
a frame;
a moveable support supported by and moveable relative to the frame, the moveable support supporting the part;
a machine tool spindle supported by the frame and moveable relative to the part, the machine tool spindle adapted to couple to the at least one tool, the moveable support and the machine tool spindle being movable by a drive system within a three-dimensional working space defined by a plurality of axis limits; and
a motion control system operably coupled to the machine tool spindle and the moveable support, the motion control system including a controller that controls movement of the machine tool spindle and the moveable support to automatically reposition the tool from a first position to a second position, both positions being specified by a part program independently of the plurality of axis limits;

wherein the controller repositions the tool by
computing at least one retract move of the tool, based on a retract vector, from the first position to a retracted position in a retract plane by adjusting the retract vector, as necessary, such that the retract vector corresponds to movement of the tool toward the retract plane while remaining within the three-dimensional working space;
computing at least one plunge move of the tool, based on a motion vector that is an inverse of a plunge vector, from the second position to a plunge position in the retract plane by adjusting the motion vector, as necessary, such that the motion vector corresponds to movement of the tool toward the retract plane while remaining within the three-dimensional working space; and
outputting motion commands to the drive system, thereby moving the tool from the first position, to the retracted position and from the plunge position to the second position, wherein the controller adjusts the retract vector by subtracting a direction component of the retract vector corresponding to an axis limit encountered during the computing of the at least one retract move to define a new retract vector for moving the tool toward the retract plane.

41. The apparatus of claim 40, wherein the controller adjusts the motion vector by subtracting a direction component of the motion vector corresponding to an axis limit encountered during the computing of the at least one plunge move to define a new motion vector for moving the tool toward the retract plane.

42. An apparatus for machining a part with at least one tool, the apparatus comprising:
a frame;
a moveable support supported by and moveable relative to the frame, the moveable support supporting the part;
a machine tool spindle supported by the frame and moveable relative to the part, the machine tool spindle adapted to couple to the at least one tool, the moveable support and the machine tool spindle being movable by a drive system within a three-dimensional working space defined by a plurality of axis limits; and
a motion control system operably coupled to the machine tool spindle and the moveable support, the motion control system including a controller that controls movement of the machine tool spindle and the moveable support to automatically reposition the tool from a first position to a second position, both positions being specified by a part program independently of the plurality of axis limits;
wherein the controller repositions the tool by
computing at least one retract move of the tool, based on a retract vector, from the first position to a retracted position in a retract plane by adjusting the retract vector, as necessary, such that the retract vector corresponds to movement of the tool toward the retract plane while remaining within the three-dimensional working space;
computing at least one plunge move of the tool, based on a motion vector that is an inverse of a plunge vector, from the second position to a plunge position in the retract plane by adjusting the motion vector, as necessary, such that the motion vector corresponds to movement of the tool toward the retract plane while remaining within the three-dimensional working space; and
outputting motion commands to the drive system, thereby moving the tool from the first position, to the retracted position and from the plunge position to the second position, wherein the controller internally executes all moves specified in the part program between a buffer on command and a buffer off command.

43. A motion control system for a multi-axis machine tool system having a support, a spindle, and a drive system coupled to the support and the spindle for adjusting the position of a tool relative to a part, the motion control system including:
an I/O module including a part program including a plurality of commands and machine configuration information that defines a three-dimensional working space of the machine tool system; and
a software controller that receives the machine configuration information from the I/O module, processes the part program commands, and outputs motion commands to the drive system that result in relative motion of the tool and the part;
wherein the software controller includes an algorithm for repositioning the tool from a first position to a second position while automatically remaining within the three-dimensional working space, both positions being specified by the part program without reference to the machine configuration information, the algorithm including the steps of
repositioning the tool by outputting motion commands to the drive system to move the tool from the first position to a reoriented position at a limit of the three-dimensional working space in an orientation relative to the part that corresponds to an orientation of the second position,
computing a retract move of the tool, based on a current retract vector, from the reoriented position to a refracted position in a retract plane by adjusting the current retract vector, as necessary, to maintain the tool within the three-dimensional working space,
computing at least one plunge move of the tool, based on a current motion vector that is an inverse of a plunge vector, from the second position to a plunge position in the retract plane by adjusting the current motion vector, as necessary, to maintain the tool within the three-dimensional working space, and
outputting motion commands to the drive system, thereby moving the tool from the first position, to the retracted position and from the plunge position to the second position, wherein the algorithm further includes the step of determining whether the current retract vector has a direction component that will move the tool from the reoriented position toward a retracted position in a retract plane.

44. The system of claim 43, wherein the step of repositioning the tool includes the step of computing a move of the tool along a tool vector from the first position to a machine limit defining, in one direction, an outer boundary of the three-dimensional working space.

45. The system of claim 44, wherein the step of repositioning the tool includes the step of computing a move of the tool along the machine limit to a second machine limit defining, in another direction, an outer boundary of the three-dimensional working space.

46. The system of claim 43, wherein the step of computing a retract move includes the step of determining whether the current retract vector is valid for moving the tool into the retracted position.

47. A motion control system for a multi-axis machine tool system having a support, a spindle, and a drive system coupled to the support and the spindle for adjusting the position of a tool relative to a part, the motion control system including:
an I/O module including a part program including a plurality of commands and machine configuration information that defines a three-dimensional working space of the machine tool system; and
a software controller that receives the machine configuration information from the I/O module, processes the part program commands, and outputs motion commands to the drive system that result in relative motion of the tool and the part;
wherein the software controller includes an algorithm for repositioning the tool from a first position to a second position while automatically remaining within the three-dimensional working space, both positions being specified by the part program without reference to the machine configuration information, the algorithm including the steps of
repositioning the tool by outputting motion commands to the drive system to move the tool from the first position to a reoriented position at a limit of the three-dimensional working space in an orientation relative to the part that corresponds to an orientation of the second position,
computing a retract move of the tool, based on a current retract vector, from the reoriented position to a refracted position in a retract plane by adjusting the current retract vector, as necessary, to maintain the tool within the three-dimensional working space,
computing at least one plunge move of the tool, based on a current motion vector that is an inverse of a plunge vector, from the second position to a plunge position in the retract plane by adjusting the current motion vector, as necessary, to maintain the tool within the three-dimensional working space, and
outputting motion commands to the drive system, thereby moving the tool from the first position, to the retracted position and from the plunge position to the second position, wherein the retract plane defines a desired safe distance of the tool from a part prior to moving the tool from the plunge position to the second position.

48. A motion control system for a multi-axis machine tool system having a support, a spindle, and a drive system coupled to the support and the spindle for adjusting the position of a tool relative to a part, the motion control system including:
an I/O module including a part program including a plurality of commands and machine configuration information that defines a three-dimensional working space of the machine tool system; and
a software controller that receives the machine configuration information from the I/O module, processes the part program commands, and outputs motion commands to the drive system that result in relative motion of the tool and the part;
wherein the software controller includes an algorithm for repositioning the tool from a first position to a second position while automatically remaining within the three-dimensional working space, both positions being specified by the part program without reference to the machine configuration information, the algorithm including the steps of
repositioning the tool by outputting motion commands to the drive system to move the tool from the first position to a reoriented position at a limit of the three-dimensional working space in an orientation relative to the part that corresponds to an orientation of the second position,
computing a retract move of the tool, based on a current retract vector, from the reoriented position to a refracted position in a retract plane by adjusting the current retract vector, as necessary, to maintain the tool within the three-dimensional working space,
computing at least one plunge move of the tool, based on a current motion vector that is an inverse of a plunge vector, from the second position to a plunge position in the retract plane by adjusting the current motion vector, as necessary, to maintain the tool within the three-dimensional working space, and
outputting motion commands to the drive system, thereby moving the tool from the first position, to the retracted position and from the plunge position to the second position, wherein the step of computing a retract move further includes the step of determining whether movement along the current retract vector will result in repositioning the tool in a retracted position in a check plane when movement along the current retract vector will not result in repositioning of the tool in the retracted position in the retract plane while maintaining the tool within the three-dimensional working space.

49. The system of claim 48, wherein the step of computing at least one plunge move further includes the step of determining whether movement along the current motion vector will result in repositioning the tool in a plunge position in a check plane when movement along the current motion vector will not result in repositioning of the tool in the plunge position in the retract plane while maintaining the tool within the three-dimensional working space.

50. The system of claim 48, wherein the check plane defines a secondary desired safe distance of the tool from the part prior to moving the tool from the plunge position to the target position.

51. A motion control system for a multi-axis machine tool system having a support, a spindle, and a drive system coupled to the support and the spindle for adjusting the position of a tool relative to a part, the motion control system including:
an I/O module including a part program including a plurality of commands and machine configuration information that defines a three-dimensional working space of the machine tool system; and
a software controller that receives the machine configuration information from the I/O module, processes the part program commands, and outputs motion commands to the drive system that result in relative motion of the tool and the part;
wherein the software controller includes an algorithm for repositioning the tool from a first position to a second position while automatically remaining within the three-dimensional working space, both positions being specified by the part program without reference to the machine configuration information, the algorithm including the steps of
repositioning the tool by outputting motion commands to the drive system to move the tool from the first position to a reoriented position at a limit of the three-dimensional working space in an orientation relative to the part that corresponds to an orientation of the second position,
computing a retract move of the tool, based on a current retract vector, from the reoriented position to a refracted position in a retract plane by adjusting the current retract vector, as necessary, to maintain the tool within the three-dimensional working space, computing at least one plunge move of the tool, based on a current motion vector that is an inverse of a plunge vector, from the second position to a plunge position in the retract plane by adjusting the current motion vector, as necessary, to maintain the tool within the three-dimensional working space, and outputting motion commands to the drive system, thereby moving the tool from the first position, to the retracted position and from the plunge position to the second position, wherein the retract vector is specified relative to a first coordinate system in a buffer off command in the part program.

52. The system of claim 51, wherein the plunge vector is specified relative to a second coordinate system corresponding to the second position in a buffer off command in the part program, the first coordinate system being different from the second coordinate system.

53. A motion control system for a multi-axis machine tool system having a support, a spindle, and a drive system coupled to the support and the spindle for adjusting the position of a tool relative to a part, the motion control system including:

an I/O module including a part program including a plurality of commands and machine configuration information that defines a three-dimensional working space of the machine tool system; and a software controller that receives the machine configuration information from the I/O module, processes the part program commands, and outputs motion commands to the drive system that result in relative motion of the tool and the part;

wherein the software controller includes an algorithm for repositioning the tool from a first position to a second position while automatically remaining within the three-dimensional working space, both positions being specified by the part program without reference to the machine configuration information, the algorithm including the steps of repositioning the tool by outputting motion commands to the drive system to move the tool from the first position to a reoriented position at a limit of the three-dimensional working space in an orientation relative to the part that corresponds to an orientation of the second position, computing a retract move of the tool, based on a current retract vector, from the reoriented position to a refracted position in a retract plane by adjusting the current retract vector, as necessary, to maintain the tool within the three-dimensional working space, computing at least one plunge move of the tool, based on a current motion vector that is an inverse of a plunge vector, from the second position to a plunge position in the retract plane by adjusting the current motion vector, as necessary, to maintain the tool within the three-dimensional working space, and outputting motion commands to the drive system, thereby moving the tool from the first position, to the retracted position and from the plunge position to the second position, wherein during the step of computing at least one plunge move, the algorithm receives as inputs the second position as a start position, a reverse order for storing the at least one plunge move, and an indication that moves below a check plane are prohibited.

54. A motion control system for a multi-axis machine tool system having a support, a spindle, and a drive system coupled to the support and the spindle for adjusting the position of a tool relative to a part, the motion control system including:

an I/O module including a part program including a plurality of commands and machine configuration information that defines a three-dimensional working space of the machine tool system; and a software controller that receives the machine configuration information from the I/O module, processes the part program commands, and outputs motion commands to the drive system that result in relative motion of the tool and the part;

wherein the software controller includes an algorithm for repositioning the tool from a first position to a second position while automatically remaining within the three-dimensional working space, both positions being specified by the part program without reference to the machine configuration information, the algorithm including the steps of repositioning the tool by outputting motion commands to the drive system to move the tool from the first position to a reoriented position at a limit of the three-dimensional working space in an orientation relative to the part that corresponds to an orientation of the second position, computing a retract move of the tool, based on a current retract vector, from the reoriented position to a refracted position in a retract plane by adjusting the current retract vector, as necessary, to maintain the tool within the three-dimensional working space, computing at least one plunge move of the tool, based on a current motion vector that is an inverse of a plunge vector, from the second position to a plunge position in the retract plane by adjusting the current motion vector, as necessary, to maintain the tool within the three-dimensional working space, and outputting motion commands to the drive system, thereby moving the tool from the first position, to the retracted position and from the plunge position to the second position, wherein the retract move and the at least one plunge move are stored in a buffer until the software controller determines that the tool can be safely moved from the first position to the second position, the outputting step including the step of executing the stored retract move and the stored at least one plunge move.

* * * * *